US012175335B2

(12) United States Patent
Bandyopadhyay et al.

(10) Patent No.: US 12,175,335 B2
(45) Date of Patent: Dec. 24, 2024

(54) ERROR CORRECTION FOR PROGRAMMABLE PHOTONICS

(71) Applicant: Massachusetts Institute of Technology, Cambridge, MA (US)

(72) Inventors: Saumil Bandyopadhyay, Cambridge, MA (US); Ryan Hamerly, Cambridge, MA (US); Dirk Robert Englund, Brookline, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 309 days.

(21) Appl. No.: 17/556,033

(22) Filed: Dec. 20, 2021

(65) Prior Publication Data

US 2022/0269972 A1    Aug. 25, 2022

Related U.S. Application Data

(60) Provisional application No. 63/151,103, filed on Feb. 19, 2021.

(51) Int. Cl.
*G06N 10/70* (2022.01)
*G02F 1/21* (2006.01)
(Continued)

(52) U.S. Cl.
CPC ............ *G06N 10/70* (2022.01); *G02F 1/212* (2021.01); *G06N 10/40* (2022.01); *H04B 10/70* (2013.01)

(58) Field of Classification Search
CPC ........ G06N 10/70; G06N 10/40; G06N 10/60; H04B 10/70; G02F 1/212; G02F 1/311;
(Continued)

(56) References Cited

U.S. PATENT DOCUMENTS 11,238,428 B1 *  2/2022  Nagarajan .............. G06Q 20/36
11,853,847 B2 * 12/2023  Choi ....................... G06N 10/00
(Continued)

FOREIGN PATENT DOCUMENTS

CA        3100326  A1 * 11/2019  ............... G02F 1/21
WO  WO-2020260067  A1 * 12/2020  ........... G06K 9/6201
WO  WO-2024050518  A1 *  3/2024

OTHER PUBLICATIONS

Annoni et al., "Unscrambling light automatically undoing strong mixing between modes," Light: Science & Applications 6, e17110 (2017), 10 pages.
(Continued)

*Primary Examiner* — Balram T Parbadia
*Assistant Examiner* — Mary A El-Shammaa
(74) *Attorney, Agent, or Firm* — Smith Baluch LLP

(57) ABSTRACT

Programmable photonic circuits of reconfigurable interferometers can be used to implement arbitrary operations on optical modes, providing a flexible platform for accelerating tasks in quantum simulation, signal processing, and artificial intelligence. A major obstacle to scaling up these systems is static fabrication error, where small component errors within each device accrue to produce significant errors within the circuit computation. Mitigating errors usually involves numerical optimization dependent on real-time feedback from the circuit, which can greatly limit the scalability of the hardware. Here, we present a resource-efficient, deterministic approach to correcting circuit errors by locally correcting hardware errors within individual optical gates. We apply our approach to simulations of large-scale optical neural networks and infinite impulse response filters implemented in programmable photonics, finding that they remain resilient to component error well beyond modern day process tolerances. Our error correction process can be used to
(Continued)

scale up programmable photonics within current fabrication processes.

20 Claims, 15 Drawing Sheets

(51) Int. Cl.
    *G06N 10/40*     (2022.01)
    *H04B 10/70*     (2013.01)

(58) Field of Classification Search
    CPC ............... G02F 1/3132; G02F 2203/69; G02F 2203/20; G02F 2201/58
    See application file for complete search history.

(56) References Cited

U.S. PATENT DOCUMENTS

| | | | | |
|---|---|---|---|---|
| 11,934,050 | B2* | 3/2024 | Okamoto | G02F 1/212 |
| 11,965,966 | B1* | 4/2024 | Doerr | G01S 7/4811 |
| 2014/0299743 | A1 | 10/2014 | Miller | |
| 2020/0150511 | A1* | 5/2020 | Carolan | G02F 1/3551 |
| 2020/0204362 | A1* | 6/2020 | Li | G06N 10/00 |
| 2020/0256728 | A1* | 8/2020 | Kita | G02F 1/212 |
| 2020/0348579 | A1* | 11/2020 | Heuck | G02F 3/00 |
| 2020/0372334 | A1* | 11/2020 | Carolan | G06N 3/088 |
| 2021/0232963 | A1* | 7/2021 | Gimeno-Segovia | G06N 10/70 |

OTHER PUBLICATIONS

Arjovsky et al., "Unitary Evolution Recurrent Neural Networks," in "Proceedings of The 33rd International Conference on Machine Learning," vol. 48 of Proceedings of Machine Learning Research (PMLR, New York, New York, USA, 2016), vol. 48 of Proceedings of Machine Learning Research, pp. 1120-1128.
Bandyopadhyay et al., "Hardware error correction for programmable photonics," Optica 8, 1247-1255 (2021).
Bogaerts et al., "Programmable photonic circuits," Nature 586, 207-216 (2020).
Burgwal et al., "Using an imperfect photonic network to implement random unitaries," Optics Express 25, 28236 (2017), 10 pages.
Carolan et al., "Universal linear optics," Science, vol. 349, pp. 711-716, Aug. 2015.
Clements et al., "Optimal design for universal multiport interferometers," Optica 3, 1460 (2016), 6 pages.
Fang et al., "Design of optical neural networks with component imprecisions," Optics Express 27, 14009 (2019) 21 pages.
Guan et al., "Compact and low loss 90-degree optical hybrid on a silicon-on-insulator platform," Optics Express 25, 28957 (2017), 12 pages.
Hamerly et al. "Accurate self-configuration of rectangular multiport interferometers." arXiv preprint arXiv:2106.03249 (2021), 8 pages.
Hamerly et al. "Stability of self-configuring large multiport interferometers." arXiv preprint arXiv:2106.04363 (2021), 13 pages.
Harris et al., "Accelerating artificial intelligence with silicon photonics," Optical Fiber Communication Conference. Optical Society of America, 2020, 4 pages.
Harris et al., "Array programming with NumPy," Nature 585, 357-362 (2020).
Harris et al., "Efficient, compact and low loss thermo-optic phase shifter in silicon," Optics Express 22, 10487 (2014), 7 pages.
Harris et al., "Linear programmable nanophotonic processors," Optica 5, 1623 (2018), 9 pages.
Harris et al., "Quantum transport simulations in a programmable nanophotonic processor," Nature Photonics 11, 447-452 (2017).
Hughes et al., "Training of photonic neural networks through in situ backpropagation and gradient measurement," Optica 5, 864 (2018), 8 pages.

Jacques et al., "Optimization of thermo-optic phase-shifter design and mitigation of thermal crosstalk on the SOI platform," Optics Express 27, 10456 (2019), 16 pages.
Johnson et al., "Block-iterative frequency-domain methods for Maxwell's equations in a planewave basis," Optics Express 8, 173 (2001), 18 pages.
Komma et al., "Thermo-optic coefficient of silicon at 1550 nm and cryogenic temperatures." Applied Physics Letters 101.4 (2012): 041905, 5 pages.
Kumar et al., "Mitigating linear optics imperfections via port allocation and compilation," arXiv:2103.03183v1 [quant-ph] Mar. 4, 2021, 13 pages.
Lee et al. "Fine-Tuning of Mach-Zehnder Phase Using Low-Resolution Digital-to-Analog Converters," IEEE Photonics Technology Letters 31.19 (2019): 1573-1575.
Lopez "Programmable integrated silicon photonics waveguide meshes: optimized designs and control algorithms." IEEE Journal of Selected Topics in Quantum Electronics 26.2 (2019): 1-12.
Lopez et al., "Auto-routing algorithm for field-programmable photonic gate arrays," Optics Express 28, 737 (2020), 16 pages.
Lu et al. "Performance prediction for silicon photonics integrated circuits with layout-dependent correlated manufacturing variability." Optics Express 25.9 (2017): 9712-9733.
Madsen et al "Optical all-pass filters for phase response design with applications for dispersion compensation." IEEE Photonics Technology Letters 10.7 (1998): 994-996.
Mason "Feedback theory-some properties of signal flow graphs." Proceedings of the IRE 41.9 (1953): 30 pages.
Mason, "Feedback Theory-Further Properties of Signal Flow Graphs," Proceedings of the IRE 44, 920{926 (1956), 10 pages.
Mikkelsen et al., "Dimensional variation tolerant silicon-on-insulator directional couplers," Optics Express 22, 3145 (2014), 6 pages.
Milanizadeh et al. "Manipulating free-space optical beams with a silicon photonic mesh." 2019 IEEE Photonics Society Summer Topical Meeting Series (SUM). IEEE, 2019, 2 pages.
Miller "Perfect optics with imperfect components." Optica 2.8 (2015): 747-750.
Miller "Self-aligning universal beam coupler." Optics Express 21.5 (2013): 6360-6370.
Miller "Self-configuring universal linear optical component." Photonics Research 1.1 (2013): 1-15.
Miller "Setting up meshes of interferometers-reversed local light interference method." Optics Express 25.23 (2017): 29233-29248.
Mower et al. "High-dimensional quantum key distribution using dispersive optics." Physical Review A 87.6 (2013): 062322, 8 pages.
Mower et al., "High-fidelity quantum state evolution in imperfect photonic integrated circuits," Physical Review A 92, 032322 (2015), 7 pages.
Notaros et al. "Programmable dispersion on a photonic integrated circuit for classical and quantum applications." Optics Express 25.18 (2017): 21275-21285.
Pai et al. "Parallel programming of an arbitrary feedforward photonic network." IEEE Journal of Selected Topics in Quantum Electronics 26.5 (2020): 1-13.
Pai, et al. "Matrix optimization on universal unitary photonic devices." Physical Review Applied 11.6 (2019): 064044, 18 pages.
Perez et al. "Field-programmable photonic arrays." Optics Express 26.21 (2018): 27265-27278.
Perez et al. "Reconfigurable lattice mesh designs for programmable photonic processors." Optics Express 24.11 (2016): 12093-12106.
Perez-Lopez et al. "Integrated photonic tunable basic units using dual-drive directional couplers." Optics Express 27.26 (2019): 38071-38086.
Perez-Lopez et al. "Multipurpose self-configuration of programmable photonic circuits." Nature Communications 11.1 (2020): 1-11.
Powell, "Direct search algorithms for optimization calculations," Acta Numerica 7, 287-336 (1998).
Prabhu et al. "Accelerating recurrent Ising machines in photonic integrated circuits." Optica 7.5 (2020): 551-558.

(56) References Cited

OTHER PUBLICATIONS

Qiang et al., "Large-scale silicon quantum photonics implementing arbitrary two-qubit processing." Nature Photonics 12.9 (2018): 534. 23 pages.

Rahimi-Keshari et al., "Direct characterization of linear-optical networks." Optics Express 21.11 (2013): 13450-13458.

Reck, M. et al., "Experimental realization of any discrete unitary operator", Phys. Rev. Lett., vol. 73, No. 1, (Jul. 4, 1994), 6 pages.

Reed et al., Silicon optical modulators, Nature Photonics 4, 518-526 (2010).

Ribeiro et al. "Demonstration of a 4×4-port universal linear circuit." Optica 3.12 (2016): 1348-1357.

Russell et al., "Direct dialling of Haar random unitary matrices," New Journal of Physics 19, 033007 (2017), 8 pages.

Shen et al., "Deep learning with coherent nanophotonic circuits," Nature Photonics 11, 441(446 (2017).

Sparrow et al., "Simulating the vibrational quantum dynamics of molecules using photonics," Nature 557, 660-667 (2018).

Streshinsky et al., "Silicon Parallel Single Mode 48×50 Gb/s Modulator and Photodetector Array," Journal of Lightwave Technology 32.22 (2014): 3768-3775.

Suzuki et al. "Ultra-high-extinction-ratio 2×2 silicon optical switch with variable splitter." Optics Express 23.7 (2015): 9086-9092.

Virtanen et al., "SciPy 1.0: Fundamental Algorithms for Scientific Computing in Python," Nature Methods 17, 261-272 (2020).

Wang et al. "Tolerant, broadband tunable 2×2 coupler circuit." Optics Express 28.4 (2020): 5555-5566.

Wang et al., "Multidimensional quantum entanglement with large-scale integrated optics," Science 360.6386 (2018): 285-291.

Watts et al., "Low-Voltage, Compact, Depletion-Mode, Silicon Mach-Zehnder Modulator," IEEE Journal of Selected Topics in Quantum Electronics 16, 159-164 (2010).

Williamson et al., "Reprogrammable Electro-Optic Nonlinear Activation Functions for Optical Neural Networks," IEEE Journal of Selected Topics in Quantum Electronics 26, 1-12 (2020).

Yang et al. "Phase coherence length in silicon photonic platform." Optics Express 23.13 (2015): 16890-16902.

Zand et al., "Effects of coupling and phase imperfections in programmable photonic hexagonal waveguide meshes," Photonics Research 8.2 (2020): 211-218.

Zhang et al., "A high-responsivity photodetector absent metal-germanium direct contact," Optics Express 22.9 (2014): 11367-11375.

Zhang et al., "Designing a High Performance TEC Controller," Tech. Rep., Analog Devices (2002), 7 pages.

Zhuang et al., "Programmable photonic signal processor chip for radiofrequency applications," Optica 2, 854 (2015), 6 pages.

\* cited by examiner

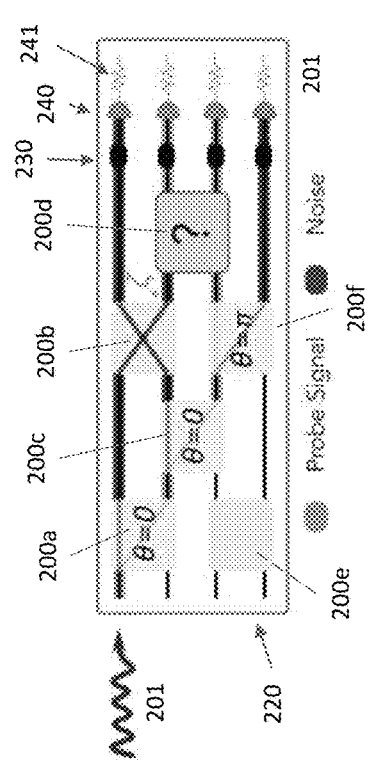
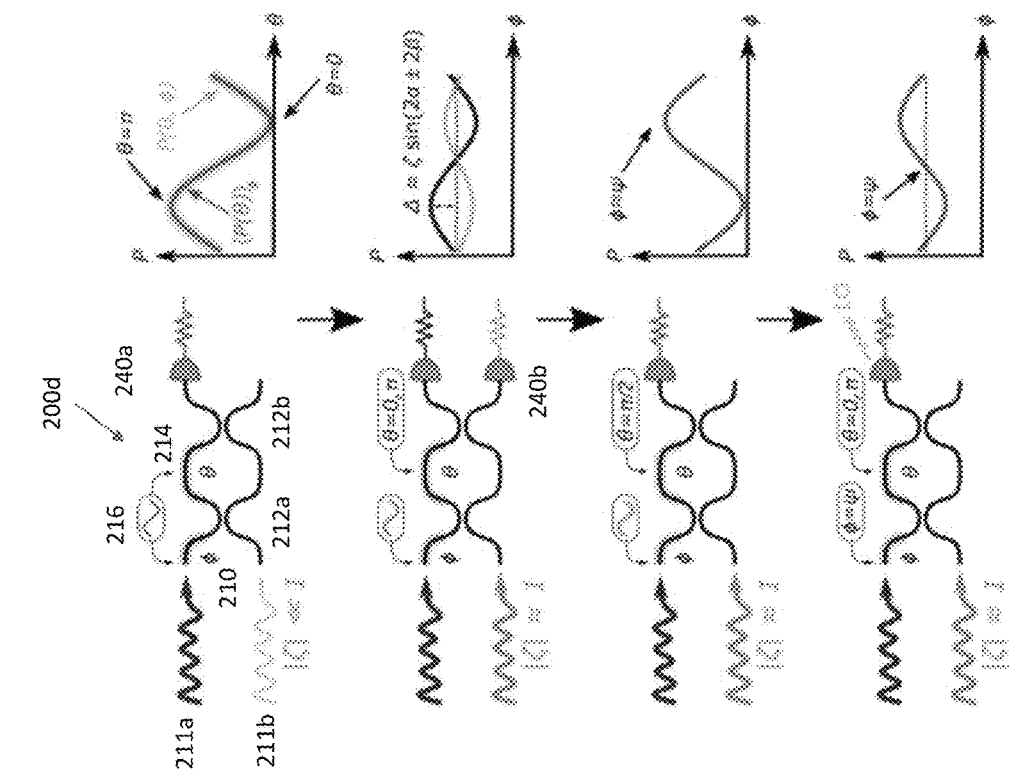
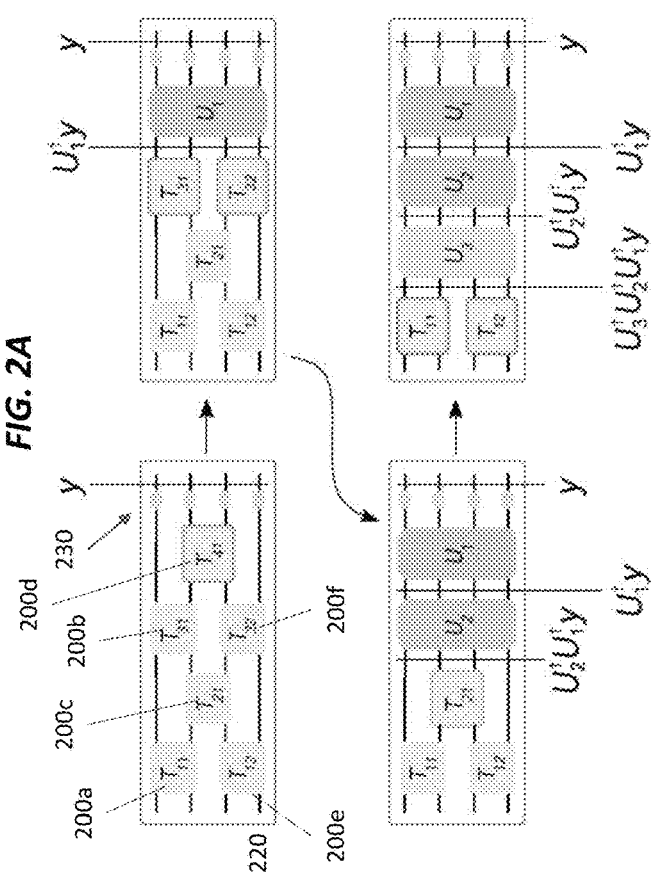
FIG. 2A
FIG. 2B
FIG. 2C

ERROR CORRECTION FOR PROGRAMMABLE PHOTONICS

CROSS-REFERENCE TO RELATED APPLICATION(S)

This application claims the priority benefit, under 35 U.S.C. 119(e), of U.S. application Ser. No. 63/151,103, which was filed on Feb. 19, 2021, and is incorporated herein by reference in its entirety for all purposes.

GOVERNMENT SUPPORT

This invention was made with government support under FA9550-16-1-0391 and FA9550-20-1-0113 awarded by the Air Force Office of Scientific Research. The government has certain rights in the invention.

BACKGROUND

Integrated photonics is a key technology for optical communications and has been advancing rapidly for applications in sensing, metrology, signal processing, and computation. Programmable photonic circuits of optical interferometers, which can implement arbitrary filters and passively compute matrix operations on optical modes, are the optical analogue to field programmable gate arrays (FPGAs). Like FPGAs, they can be flexibly reconfigured post-fabrication by software. These circuits can operate on up to tens of optical modes and have been used to accelerate tasks in quantum simulation, mode unscrambling, signal processing, combinatorial optimization, and artificial intelligence.

While scaling up programmable photonic circuits to hundreds or thousands of modes would be immensely beneficial, doing so involves precise fabrication of tens of thousands of optical interferometers. Unfortunately, static component errors induced by process variation accrue rapidly for larger systems, limiting the systems' usefulness for many applications. This is because the decomposition and optimization techniques used to program these circuits assume that all of the components are ideal; thus, any component errors result in a programming of the wrong operation. Component imprecision therefore has serious implications for the future of these systems; for example, beam splitter variation as small as 2%, which is a typical wafer-level variance, can degrade accuracy by nearly 50% for feedforward circuits used to implement classifiers for the MNIST image recognition task. Alternative programmable architectures, such as recirculating waveguide meshes formed of triangular or hexagonal MZI lattices, are similarly susceptible to component-induced error; device variation within these circuits introduces phase errors and resonance shifts that alter the transfer functions of phase-sensitive filters. This degree of sensitivity to component variability makes control of these systems challenging when scaling up to large numbers of modes.

Hardware errors are usually compensated for with numerical optimization. A number of global optimization approaches have been proposed in the past, including non-linear optimization, gradient descent, and in-situ backpropagation and training for neural networks. These strategies, however, are time-consuming and scale poorly with circuit size. Moreover, it is often inefficient to retrain hardware settings for individual chips. For many tasks, such as machine learning, model training is energy intensive; if the same model parameters are broadcast to thousands of chips within a data center, retraining the model for each chip with a unique set of component imprecisions can be very costly and time consuming. One can instead employ progressive algorithms making use of local feedback; however, these algorithms, which iteratively optimize the settings of one device at a time, require $O(N^2)$ tap photodiodes to monitor the optical power within the individual interferometers. This requirement greatly increases the number of electrical lines and overall power consumption of the system.

This focus on in-situ approaches reveals a critical roadblock for programmable photonics compared to electronic FPGAs. An FPGA does not optimize hardware settings in real time off readings taken directly from the chip; rather, control software takes it for granted that the logic gates are ideal and maps the requested function into a netlist that can be placed and routed within the chip. A similar capability for programmable photonics would greatly improve the scalability of these systems; if this were the case, a desired optical function could be trained once on an idealized software model and ported over to many chips. A challenge for programmable photonics is that unlike FPGAs, photonic circuits are analog systems that are far more sensitive to errors within the optical components. Enabling this level of scalability may therefore involve the ability to deterministically correct hardware errors in photonic chips.

SUMMARY

If a unitary operation is realizable by an imperfect photonic circuit, it should not require optimization to deduce the required settings; rather, a small perturbation in the device behavior due to component deviation should translate directly to a small perturbation in the interferometer's phase settings to recover the original unitary. This insight has led us to consider a local error correction strategy, where circuit functionality is restored by correcting hardware errors one at a time within each optical gate composing the circuit.

Here, we present a process to directly correct hardware errors for a programmable photonic circuit. Our process outperforms previous approaches in several key respects: 1) it is flexible, enabling a one-time device calibration to directly compute the hardware settings for any given unitary; 2) for sufficiently low hardware errors, the computed settings yield the exact unitary desired; and 3) our approach requires reduced or minimal overhead and does not make use of additional interferometers or internal detectors within every device. Our process can be used to correct fabrication errors in feedforward programmable circuits that implement arbitrary unitary matrices, as these systems have the most demanding requirements for fabrication precision. It can also be applied to other programmable circuits, such as recirculating architectures. Our local error correction strategy individually corrects each 2×2 optical gate within the circuit. It can be generalized to any programmable architecture making use of interferometers, including feedforward circuits with redundant devices and recirculating waveguide meshes.

Applying our approach to programmable photonics, such as optical neural networks and programmable coupled-ring systems, enables resilience to fabrication errors well beyond modern-day process tolerances. Error correction also greatly reduces the overhead for programmable photonics that require optimization to deduce the hardware settings, as it eliminates the need to retrain for each individual set of hardware with unknown fabrication errors. Current process tolerances suggest that our approach enables improved functionality for systems of up to hundreds of modes, providing a new avenue for scaling up programmable photonics.

Our method of correcting individual component errors in a programmable photonic circuit comprising a network of interconnected Mach-Zehnder interferometers arranged in columns can be implemented as follows. Consider that the network of interconnected Mach-Zehnder interferometers comprises a first Mach-Zehnder interferometer having outputs coupled to respective photodetectors and a second-to-last column with a second Mach-Zehnder interferometer having outputs coupled to respective inputs of the first Mach-Zehnder interferometer. First, we determine the individual component errors within the first Mach-Zehnder interferometer based on measurements made with the respective photodetectors coupled to the outputs of the first Mach-Zehnder interferometer. Then we set the first Mach-Zehnder interferometer based on the individual component errors within the first Mach-Zehnder interferometer. Next, we determine the individual component errors within the second Mach-Zehnder interferometer based on measurements made with the respective photodetectors coupled to the outputs of the first Mach-Zehnder interferometer. We then determine external and internal phase shifts for respective Mach-Zehnder interferometers in the network of interconnected Mach-Zehnder interferometers that correct the individual component errors for the respective Mach-Zehnder interferometers. We the internal and external phase shifts to the respective Mach-Zehnder interferometers, with the internal and external phase shifts correcting splitting errors and input phase errors, respectively, induced by the individual component errors. We also determine auxiliary phase shifts on the input and output waveguides for the respective Mach-Zehnder interferometers to correct for output phase errors induced by component errors.

Each internal phase shift can be between $2|\alpha+\beta|$ and $\pi-2|\alpha-\beta|$, where $\alpha$ and $\beta$ represent static fabrication errors in beam splitters in the corresponding Mach-Zehnder interferometer. Each internal phase shift can compensate the static fabrication errors induced by the beam splitters in the corresponding Mach-Zehnder interferometer.

The auxiliary phase shifts can be applied to the output modes of the second Mach-Zehnder interferometer by modulating an external phase shifter of the first Mach-Zehnder interferometer. The auxiliary phase shifts can also be applied by propagating the auxiliary phase shifts through columns of the network of Mach-Zehnder interferometers.

The programmable photonic circuit can be a feedforward programmable photonic circuit, in which case applying the internal and/or external phase shifts reduces an error of a matrix operation implemented by the feedforward programmable photonic circuit. If the programmable photonic circuit computes an optical neural network, then applying the internal and/or external phase shifts increases a fabrication tolerance of computed in the optical neural network. And if the programmable photonic circuit is a programmable recirculating waveguide mesh, then applying the internal and/or external phase shifts corrects at least one error in operation of the programmable recirculating waveguide mesh.

The first Mach-Zehnder interferometer may include an external phase shifter, a first beam splitter coupled to the external phase shifter, an internal phase shifter coupled to the first beam splitter, and a second beam splitter coupled to the internal phase shifter. In this case, determining the individual component errors within the first Mach-Zehnder interferometer comprises three steps. First, calibrate the internal phase shifter based on light intensity transmitted from a first input of the Mach-Zehnder interferometer to a first output of the Mach-Zehnder interferometer as a function of internal phase shift applied by the internal phase shifter averaged over a range of external phase shifts applied by the external phase shifter. Second, determine splitting errors for the first and second beam splitters based on light intensity transmitted from the first input and a second input of the Mach-Zehnder interferometer to the first output and a second output of the Mach-Zehnder interferometer as a function of the external phase shift applied by the external phase shifter at internal phase shifts of 0, $\pi/2$, and $\pi$. Third, calibrate the external phase shifter based on a phase of light transmitted from the first and second inputs of the Mach-Zehnder interferometer to the first output of the Mach-Zehnder interferometer at internal phase shifts of 0 and $\pi$.

Determining the splitting errors for the first and second beam splitters can include two steps. First, determine amplitudes of the splitting errors based on the light intensity transmitted from the first and second inputs of the Mach-Zehnder interferometer to the first and second outputs of the Mach-Zehnder interferometer as a function of the external phase shift applied by the external phase shifter at the internal phase shifts of 0 and $\pi$. Second, resolve signs of the splitting errors based on the light intensity transmitted from the first and second inputs of the Mach-Zehnder interferometer to the first and second outputs of the Mach-Zehnder interferometer as a function of the external phase shift applied by the external phase shifter at the internal phase shift of $\pi/2$.

The network of interconnected Mach-Zehnder interferometers can be a triangular network of interconnected Mach-Zehnder interferometers, in which case determining the individual component errors within the first Mach-Zehnder interferometer may comprise two steps. First, calibrate the internal phase shifter based on light intensity transmitted from a first input of the Mach-Zehnder interferometer to a first output of the Mach-Zehnder interferometer as a function of internal phase shift applied by the internal phase shifter. Second, determine splitting errors for the first and second beam splitters based on light intensity transmitted from the first and second inputs of the Mach-Zehnder interferometer to the first and second outputs of the Mach-Zehnder interferometer as a function of internal phase shift applied by the internal phase shifter.

If the network of interconnected Mach-Zehnder interferometers is a triangular network of interconnected Mach-Zehnder interferometers and the first Mach-Zehnder interferometer and the second Mach-Zehnder interferometer are in a first diagonal in the triangular network of interconnected Mach-Zehnder interferometers, our process may also include, after determining the individual component errors within the second Mach-Zehnder interferometer, programming the first diagonal to act as a homodyne detector. Then the other Mach-Zehnder interferometers in the triangular network of interconnected Mach-Zehnder interferometers can be calibrated with only intensity measurements.

A calibrated programmable photonic circuit can include a network of interconnected Mach-Zehnder interferometers with Mach-Zehnder interferometers tuned to apply respective internal phases correcting splitting errors induced by individual component errors of the Mach-Zehnder interferometers and to apply respective external phase shifts correcting input phase errors induced by the individual component errors. This programmable photonic circuit can also include auxiliary phase shifters that are in optical communication with respective outputs of the network of interconnected Mach-Zehnder interferometers and configured to apply auxiliary phase shifts to correct for output phase errors induced by the individual component errors. And it can include photodetectors that are in optical communication with respective outputs of the auxiliary phase shifters and configured to detect signals transmitted through the network of interconnected Mach-Zehnder interferometers for determining the individual component errors.

Another example of our method of correcting individual component errors in a programmable photonic circuit comprising a network of interconnected Mach-Zehnder interferometers begins with determining the individual component errors within each Mach-Zehnder interferometer in the network of interconnected Mach-Zehnder interferometers. Next, we determine external phase shifts and internal phase shifts for respective Mach-Zehnder interferometers in the network of interconnected Mach-Zehnder interferometers that correct the individual component errors for the respective Mach-Zehnder interferometers. We apply the internal and external phase shifts to the respective Mach-Zehnder interferometers, with the internal and external phase shifts correcting splitting errors and input phase errors, respectively, induced by the respective individual component errors. We also determine auxiliary phase shifts on the input and output waveguides for the respective Mach-Zehnder interferometers to correct for output phase errors induced by component errors.

All combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. The terminology employed herein that also may appear in any disclosure incorporated by reference should be accorded a meaning most consistent with the particular concepts disclosed herein.

Other systems, processes, and features will become apparent to those skilled in the art upon examination of the following drawings and detailed description. It is intended that all such additional systems, processes, and features be included within this description, be within the scope of the present invention, and be protected by the accompanying claims.

BRIEF DESCRIPTION OF THE DRAWINGS

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

FIG. 2A illustrates how MZIs are characterized by programming "wire paths" into a programmable photonic circuit, where each MZI along the route is set to the cross or bar state. However, device errors along the path scatter spurious light throughout the circuit, introducing errors into calibration.

FIG. 2B illustrates an alternative four-step MZI calibration process. First, an optical signal is sent into one port of the MZI. Optimizing the output optical power averaged over $\phi$ produces an accurate calibration for $\theta$. The second step is to input optical signals into both ports and modulate the phase of one input while setting $\theta$ to the cross and bar states to measure $|\alpha+\beta|$ and $|\alpha-\beta|$. This procedure has a sign ambiguity that is resolved in the third step, where the MZI is programmed to act as a 50-50 beam splitter and output power vs. $\phi$ is optimized to set the two inputs into phase. Resetting to the cross/bar states and driving $\phi$ then allows us to deduce the signs of $\alpha$ and $\beta$. The final step is to set the two inputs into phase and use coherent detection to measure the difference in the phase of the output field between cross and bar states, which provides a calibration for $\phi$.

FIG. 2C illustrates how circuit calibration is completed from the output working backwards to the input. For devices in the middle of the network homodyne detection can be used to infer the output fields at any device of interest.

DETAILED DESCRIPTION

Figure 1B:
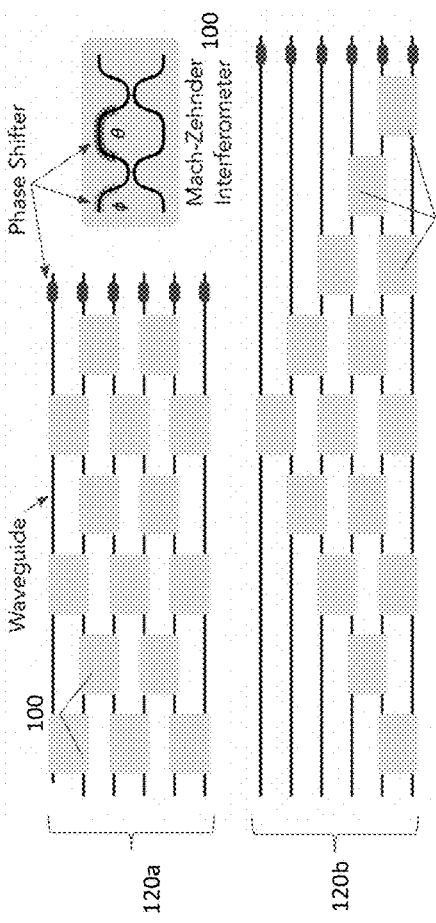
FIG. 1B shows how arbitrary higher-dimensional matrix operations can be implemented by connecting $N(N-1)/2$ MZIs in a rectangular (top) or triangular (bottom) configuration. The Reck (triangular) and Clements (rectangular) decompositions describe a procedure for computing the phase settings for each MZI, but they assume the components are ideal.

A programmable photonic circuit typically comprises phase shifters and passive beam splitters integrated onto a semiconductor substrate and connected by integrated waveguides. The phase shifters and beam splitters form Mach-Zehnder interferometers (MZIs) that can be switched between cross or bar configurations to route the light through the waveguides within the circuit. If the routing MZIs are ideal, then cross or bar settings will direct a signal from the circuit input into the desired circuit output. In practice, however, the MZIs are not ideal due to fabrication errors, temperature fluctuations, and/or other imperfections or perturbations. Instead of having perfect extinction ratios, the MZIs have finite extinction ratios, which cause small amounts of spurious, unwanted light to scatter randomly into the other MZIs and devices in the programmable photonic circuit.

Our error-correction process accounts for errors caused by finite extinction ratios and other imperfections among the components of a programmable photonic circuit. It involves calibrating each phase shifter and passive beam splitter in the programmable photonic circuit, followed by calculating and applying phase shifts via the phase shifters to account for the finite extinction ratios of the MZIs and other errors in the programmable photonic circuit. Put differently, our approach involves pre-characterization of each phase shifter and passive splitter in the programmable photonic circuit. This calibration may be performed once, with the results stored in a lookup table. Once the values are stored in a lookup table, any arbitrary unitary can be programmed by computing the settings for an ideal set of MZIs and then converting them, one by one, to the corresponding settings for an imperfect device as explained below.

While characterization of the overall linear transformation U performed by a programmable photonic circuit is fairly straightforward, the lack of direct access to individual optical elements in the programmable photonic circuit makes measurement of their characteristics quite challenging. Nevertheless, our process can calibrate all components in the programmable photonic circuit with interference measurements and homodyne detection on the circuit outputs. Unlike other approaches, our process yields the circuit parameters directly from the measurements at the circuit outputs and does not rely on detectors embedded within the circuit. In addition, our process can be readily applied to any arbitrary network of MZIs, whereas other approaches are limited to particular programmable photonic circuit architectures.

Our simulations (below) suggest that our hardware error correction process can greatly improve the performance of both feedforward and recirculating circuits, even for devices with relatively high optical losses. As fabrication processes improve, the effect of these losses on circuit performance will diminish further. Moreover, arbitrary feedforward circuits can be programmed using MZIs that omit the external phase shifter $\phi$ and instead program both internal arms of the interferometer. This effectively halves the circuit depth and would further reduce the impact of device losses on circuit error.

Errors in Mach-Zehnder Interferometers (MZIs)

Figure 1A:
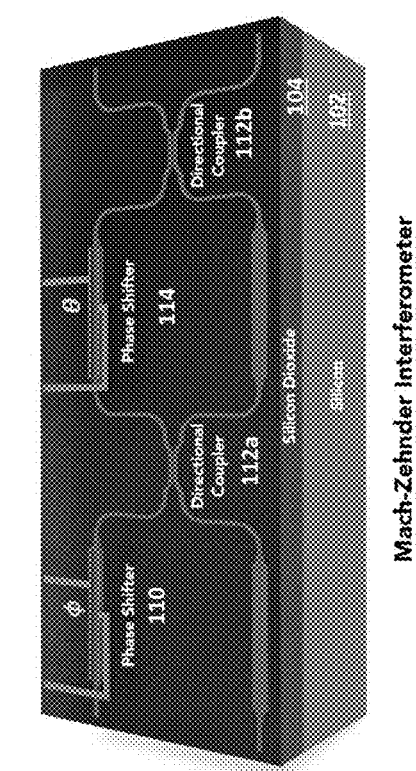
FIG. 1A shows a Mach-Zehnder interferometer (MZI) on a silicon-on-insulator platform, which is composed of two 50-50 splitters, in the illustration implemented with directional couplers, and an internal phase shifter $\theta$ implemented with, for example, a thermo-optic phase shifter. It may also include an external phase shifter $\phi$ on one of the input or output modes. These devices act as electrically-controlled 2×2 optical gates in programmable photonics.

FIG. 1A shows a 2×2 MZI 100 that can be used as a component of a programmable photonic circuit. The MZI 100 is formed, for example, on a silicon dioxide layer 104 on a silicon substrate 102. (Other programmable photonic circuits can be formed using other material platforms, including silicon nitride and lithium niobate.) It is composed of an external phase shifter 110 on one input, two 50-50 beam splitters 112a and 112b (collectively, beam splitters 112), and an internal phase shifter 114 on one of the modes between the beam splitters 112. In operation, the external phase shifter 110 imparts an external phase shift $\phi$, and the internal phase shifter 114 imparts an internal phase shift $\theta$. In a silicon photonics platform, these phase shifters 110 and 114 can be implemented as thermo-optic or electro-optic modulators.

This MZI 100 like can operate as the fundamental optical gate of a programmable photonic circuit. It can be used as an electrically programmable beam splitter capable of performing an arbitrary 2×2 unitary operation $T_{ij}(\theta, \phi)$ on a pair of optical modes i,j that is parameterized by the external phase shift $\phi$ and the internal phase shift $\theta$.

On an integrated photonics platform, each 50-50 beam splitter 112 can be realized by a directional coupler or a multimode interferometer (MMI). The operation of these beam splitters 112 can be described by the following 2×2 matrix:

$$\begin{bmatrix} \cos(\pi/4 + \alpha) & i\sin(\pi/4 + \alpha) \\ i\sin(\pi/4 + \alpha) & \cos(\pi/4 + \alpha) \end{bmatrix} \quad (1)$$

where $\alpha$ describes the deviation from ideal 50-50 splitting behavior. For an ideal beam splitter $\alpha=0$, and this matrix reduces to:

$$\frac{1}{\sqrt{2}}\begin{bmatrix} 1 & i \\ i & 1 \end{bmatrix} \quad (2)$$

The overall operation $T_{ij}(\theta, \phi)$ performed by a single ideal MZI is therefore:

$$T_{ij}(\theta, \phi) = \\ \frac{1}{2}\begin{bmatrix} 1 & i \\ i & 1 \end{bmatrix}\begin{bmatrix} e^{i\theta} & 0 \\ 0 & 1 \end{bmatrix}\begin{bmatrix} 1 & i \\ i & 1 \end{bmatrix}\begin{bmatrix} e^{i\phi} & 0 \\ 0 & 1 \end{bmatrix} = ie^{i\theta/2}\begin{bmatrix} e^{i\phi}\sin(\theta/2) & \cos(\theta/2) \\ e^{i\phi}\cos(\theta/2) & -\sin(\theta/2) \end{bmatrix} \quad (3)$$

where $\theta, \phi$ are single-mode phase shifts on the top arm of the MZI 100 as shown in FIG. 1A. (Other architectures for a 2×2 gate are also possible.)

FIG. 1B shows programmable photonic circuits 120a and 120b (collectively, programmable photonic circuits 120) with rectangular and triangular configurations, respectively, of MZIs 100. These programmable photonic circuits 120 can implement higher-dimensional matrix operations by applying the Clements and Reck decompositions. These processes decompose an arbitrary N-dimensional unitary U into a product of $N(N-1)/2$ two-dimensional unitaries computed by interference between nearest-neighbor optical modes, followed by phase shifts on the output modes corresponding to a diagonal matrix D:

$$U = D\Pi T_{ij}(\theta,\phi) \quad (4)$$

Figure 1C:
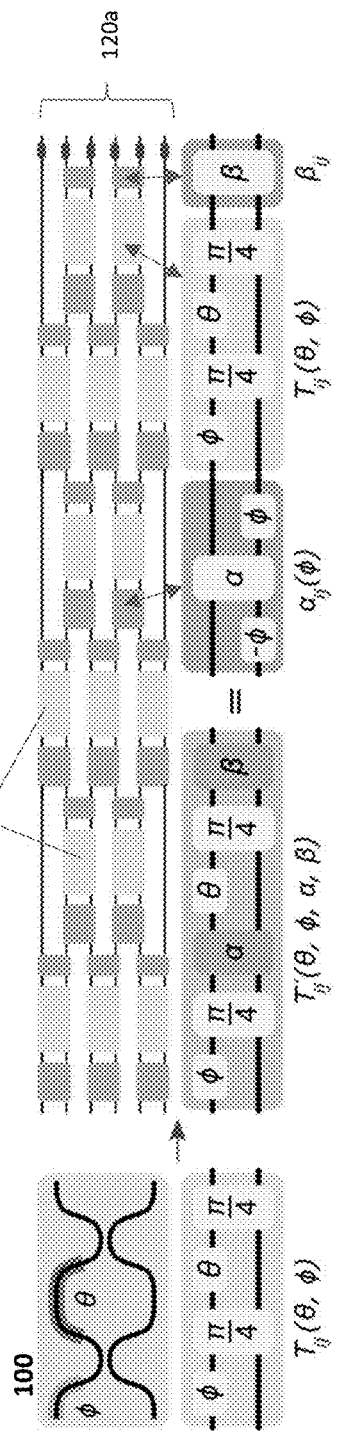
FIG. 1C shows that a realistic MZI implemented on a photonics platform will have splitting errors $\alpha, \beta$ for the two directional couplers within the interferometer. The effect of these hardware errors is to left- and right-multiply each programmable 2×2 unitary $T_{ij}(\theta, \phi)$ implemented by an MZI by error matrices $\alpha_{ij}, \beta_{ij}(\phi)$. Applying the standard decomposition for ideal components to these imperfect optical gates will not produce the correct gate operation.
Figure 1C:
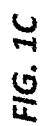

FIG. 1C illustrates the impact of fabrication error on the MZIs 100 and the photonic circuits 120. An actual MZI 100' can be represented as an ideal MZI 100 with imperfect splitters 112. These splitters can be characterized as having errors $\alpha,\beta$ as shown in the lower center and lower right of FIG. 1C. As a result, the operation (transmission) of the actual MZI 100' can be parameterized with four variables $T_{ij}'(\theta, \phi, \alpha, \beta)$:

$$ie^{i\theta/2}\begin{bmatrix} e^{i\phi}(\cos(\alpha-\beta)\sin\theta/2 + & (\cos(\alpha+\beta)\sin\theta/2 + \\ i\sin(\alpha+\beta)\cos\theta/2) & i\sin(\alpha-\beta)\cos\theta/2) \\ e^{i\phi}(\cos(\alpha+\beta)\sin\theta/2 - & -\cos(\alpha-\beta)\sin\theta/2 + \\ i\sin(\alpha-\beta)\cos\theta/2) & i\sin(\alpha+\beta)\cos\theta/2 \end{bmatrix} = \\ \begin{bmatrix} \cos\beta & i\sin\beta \\ i\sin\beta & \cos\beta \end{bmatrix}\hat{T}(\theta,\phi)\begin{bmatrix} \cos\alpha & ie^{-i\phi}\sin\alpha \\ ie^{i\phi}\sin\alpha & \cos\alpha \end{bmatrix} \quad (5)$$

In the limit $\alpha,\beta \to 0$, the second term of each entry in the matrix $T_{ij}'(\theta, \phi, \alpha, \beta)$ drops out, leaving the expected transformation for the ideal device 100. Implementing the usual decomposition on an imperfect device will not yield the desired unitary:

$$D\Pi T_{ij}'(\theta,\phi,\alpha,\beta) \ne D\Pi T_{ij}(\theta,\phi) \quad (6)$$

To program a desired unitary U=ΠT$_{ij}$(θ, ϕ) into an imperfect circuit, we can apply local corrections θ→θ', ϕ→ϕ' to each device such that T$_{ij}$'(θ', ϕ', α, β)=T$_{ij}$(θ, ϕ) as described below.

MZI and Programmable Photonic Circuit Error Calibration and Correction

Before the local corrections are applied to a programmable photonic circuit, they can be determined based on calibration or characterization of the MZIs and other components that make up the programmable photonic circuit. An MZI in a programmable photonic circuit can be characterized by inputting an optical signal E$_1$ into one input port (left) and measuring the transmission at one or both output ports as the internal and external phase shifts θ, ϕ are varied. However, characterizing an MZI in the middle of a programmable photonic circuit (e.g., a rectangular or triangular network of MZIs) involves routing the optical signal through other MZIs, each of which are programmed to cross (θ=0) or bar (θ=π) configurations to route the light through wire paths within the circuit. If the routing MZIs are ideal, then cross or bar settings will direct the input probe signal E$_1$ into the desired output.

Imperfect devices like those in FIG. 1C, however, are unable to realize ideal cross or bar configurations; as a result, a small amount of light sin(α±β)E$_1$ exits the unwanted output wherever light interacts with a device in the optical path, where α and β represent the errors in the MZI's beam splitters. These spurious signals scatter randomly throughout the network; as a result, any device being characterized with a signal E$_1$ into one input may also have a small, unwanted signal E$_2$=ζE$_1$ (ζ«1) incident upon the other input. If unaccounted for, this extraneous light introduces an error OM in the calibration process that can be on the order of the beam splitter errors being corrected.

FIG. 2A illustrates a first process for calibrating an MZI 200d in a programmable photonic circuit 220 that also includes MZIs 200a-200e as well as a phase shifter 230 and photodetector 240 at each output. Calibration need only be performed once but can be repeated if desired. In this example, a probe signal 201 is coupled into the upper input of the programmable photonic circuit 220. MZIs 200a and 200c are set to the cross state and MZI 200f is set to the bar state so that the probe signal 201 is coupled into the lower input of MZI 200d. MZI 200b can also be modulated with low-frequency modulation, enabling spurious light traveling through other MZIs to be eliminated in the Fourier transform of the output. The photodetectors 240 sense light 241 at the circuit outputs, including both the desired outputs from the MZI 200d being characterized and noise or unwanted light at the other circuit outputs.

FIGS. 2B and 2C illustrate an alternate process for calibrating the MZIs 200a-200e in the programmable photonic circuit 220. This process is applicable to devices where the relative phase of the two inputs are controllable with a phase shifter, such as an external phase shifter 212. This calibration process uses coherent detection at the outputs capable of reconstructing the field amplitude and phase. It can be applied to MZIs 200 coupled together in a network or programmable photonic circuit without internal detectors at each MZI output.

FIG. 2B shows a process for calibrating a single MZI 200d, which includes an internal phase shifter 210, first and second beam splitters 212a and 212b, and external phase shifter 214 coupled to a DC voltage source 216. The phase shifters 210 and 214 can be coupled to and driven by different channels of the same device or to separate devices.

In this example, the MZI 200d is in the last column of the MZI network and so has outputs coupled directly to photodetectors 240a and 240b (an optional phase shifter 230 is omitted for clarity).

Light 201a is input into the circuit and each MZI 200 in the path from the input to MZI 220d being calibrated is optimized to maximize the signal input into the device of interest (MZI 220d), e.g., by tuning the phase shifter to maximize the intensity of the optical signal at the output. The precise amount of light incident upon the device being characterized is not important, so long as enough light reaches MZI 200d to produce measurements above the detector noise floor. The input signal vector to MZI 200d is of the form x=E[1, ζe$^{iψ}$], where E is not known and ζ«1 is an unknown scaling factor indicating the amount of spurious light entering the other input.

Once light is coupled into the MZI 200d, the internal phase shifter 214 is calibrated by sweeping the voltage applied to the internal phase shifter 214 by the DC source 216 and measuring the output transmission with either or both photodetectors 240a and 240b (FIG. 2B, top). We input a strong signal 211a into the top input of the MZI 200d; due to device errors, a small, unknown input 211b with relative phase ψ and amplitude |ζ|«1 will also be incident upon the bottom input of the MZI 200d. The power exiting the top output port is proportional to:

$$P_{top} = \frac{1}{2}(|ζ|^2 - 1)\cos(2α)\cos(2β)\cos θ - |ζ|\cos(2α)\sin(2β)\sin(ϕ - ψ) +$$
$$|ζ|\cos(2β)\left[\cos^2\left(\frac{π}{4} + α\right)\sin(θ + ϕ - ψ) + \sin^2\left(\frac{ϕ}{4} + α\right)\sin(θ - ϕ + ψ)\right]$$

If |ζ|=0, we can calibrate the internal phase shifter 214 by observing that P$_{top}$ is minimized at θ=0. However, if |ζ|≠0, there are contributions to P$_{top}$ dependent solely on the external phase ϕ and jointly on both the internal and external phases, θ, ϕ; as a result, optical power is minimized at:

$$θ_{max} = \arctan\left[\frac{2|ζ|\cos(ϕ - ψ)}{(|ζ|^2 - 1)\cos(2α) - 2|ζ|\sin(2α)\sin(ϕ - ψ)}\right] \approx -2|ζ|\cos(ϕ - ψ)$$

Simply optimizing P$_{top}$ with respect to the internal phase would therefore produce a calibration error on the order of O(ζ).

We can avoid this error by observing that if we average P$_{top}$ over all values of external phase ϕ, this measurement is always minimized at an internal phase of θ=0:

$$\langle P_{top} \rangle_ϕ = ½(1+|ζ|^2+(1-|ζ|^2)\sin(2α)\sin(2β))+½(|ζ|^2-1)\cos(2α)\cos(2β)\cos θ$$

The internal phase shifter 214 is therefore calibrated by constructing the two-dimensional transmission characteristic P$_{top}$(θ, ϕ) and optimizing the average transmission over all settings for the external phase, ϕ. The internal phase shifter setting for θ=π can similarly be obtained by maximizing this measurement, and arbitrary phase settings can be found by fitting this expression to the measured transmission.

With the internal phase shifter 214 characterized, the beam splitter errors α and β can be obtained by programming the bar (θ=π) or cross (θ=0) settings into the MZI 200d with high fidelity (FIG. 2B, upper middle). These settings correspond to the unitaries:

$$U_{bar} = -\begin{bmatrix} e^{i\phi}\cos(\alpha-\beta) & i\sin(\alpha-\beta) \\ -e^{i\phi}i\sin(\alpha-\beta) & -\cos(\alpha-\beta) \end{bmatrix}$$

$$U_{cross} = i\begin{bmatrix} e^{i\phi}i\sin(\alpha+\beta) & \cos(\alpha+\beta) \\ e^{i\phi}\cos(\alpha+\beta) & i\sin(\alpha+\beta) \end{bmatrix}$$

For ideal MZIs, $\alpha=\beta=0$ and these unitaries reduce to the identity and swap operations, respectively.

The beam splitter calibration is now performed by sending roughly equal amounts of light into both inputs of the MZI 200d, i.e., applying an input field vector $x=E[1, \zeta e^{i\psi}]$ where $\zeta\approx 1$ but once more the precise scaling factor is unknown. This can be achieved by either inputting coherent light into two inputs of the circuit, or by inputting light into one port and programming an MZI earlier along the wire (waveguide) path to operate as an approximate 50-50 beam splitter.

We first set $\theta=0$ and measure the photocurrent $I_{top}$, $I_{bottom}$ at both outputs of the MZI 200d as a function of the external phase shift $\phi$:

$$I_{top,\theta=0}=R_{top}|E|^2(1+(R|\zeta|^2-1)\cos^2(\alpha+\beta)-|\zeta|\sin(2(\alpha+\beta))\sin(\pi-\psi))$$

$$I_{bottom,\theta=0}=R_{bottom}|E|^2(1+(|\zeta|^2-1)\sin^2(\alpha+\beta)+|\zeta|\sin(2(\alpha+\beta))\sin(\phi-\psi))$$

where $R_{top}$, $R_{bottom}$ are the unknown responsivities of the photodetectors. This measurement produces a modulation of the photocurrent as the relative phase $\phi-\psi$ between inputs (controlled by $\phi$) is varied. The interference visibilities $\Delta=(I_{max}-I_{min})/(I_{max}+I_{min})$ for the top and bottom outputs are:

$$\Delta_{top,\theta=0} = \frac{|\zeta\sin(2(\alpha+\beta))|}{1+(|\zeta|^2-1)\cos^2(\alpha+\beta)}$$

$$\Delta_{bottom,\theta=0} = \frac{|\zeta\sin(2(\alpha+\beta))|}{1+(|\zeta|^2-1)\sin^2(\alpha+\beta)}$$

Solving this system of equations yields values for $\zeta$ and $|\alpha+\beta|$.

Repeating this procedure for $\theta=\pi$ provides expressions that can be solved to find $|\alpha-\beta|$:

$$\Delta_{top,\theta=\pi} = \frac{|\zeta\sin(2(\alpha-\beta))|}{1+(|\zeta|^2-1)\sin^2(\alpha-\beta)}$$

$$\Delta_{bottom,\theta=\pi} = \frac{|\zeta\sin(2(\alpha-\beta))|}{1+(|\zeta|^2-1)\cos^2(\alpha-\beta)}$$

In the limit of $\zeta\to 1$, the interference visibilities are related directly to the beam splitter errors, i.e., $\Delta_{\theta=0}=\sin(2(\alpha+\beta))$ and $\Delta_{\theta=\pi}=\sin(2(\alpha-\beta))$.

This procedure characterizes how much the two input modes mix through interference when the MZI 200d is set to the cross and bar states. In an ideal device, the bar and cross configurations implement identity and swap operations, inhibiting interference between the input modes. Any observed interference is therefore the product of beam splitter errors within the MZI 200d. Inputting roughly equal amounts of light into both inputs ($\zeta\approx 1$) maximizes the interference visibility, which has the advantage of being insensitive to detector responsivity and out-coupling loss.

Next, we deduce the signs of the sum and difference of the beam splitter errors, $|\alpha+\beta|$ and $|\alpha-\beta|$ (FIG. 2B, lower middle). To do this, we set $\theta=\pi/2$ and tune $\phi$ to maximize power exiting the top port, which occurs when $\phi\approx\psi$. Having identified the setting of the external phase shifter 210 corresponding to $\psi$, we can now reset back to the cross state. If $I_{top}$ increases (decreases) when the voltage applied to the external phase shifter 210 is increased, then $\alpha+\beta$ is negative (positive). The procedure is repeated for the bar state to determine the sign of $\alpha-\beta$. These measurements provide sufficient information to compute $\alpha,\beta$ exactly.

The bottom of FIG. 2B illustrates precise calibration of the external phase shifter 210 through measurement of the output field phase with coherent detection of interference between the output(s) and a local oscillator (LO). The LO may be generated by picking off a portion of the input into the programmable photonic circuit 220 and coupling to the detectors 240. We input strong optical signals 201a and 201b into the input ports of the MZI 200d, program the MZI 200d to the cross state, and tune the external phase $\phi$ to precisely set $\phi=\psi$ using the equations above for the photocurrent $I_{top}$, $I_{bottom}$ at both outputs of the MZI 200d. The phase of the signal exiting the top output is:

$$\arg E_{top,\theta=0}=\psi+a\tan 2[|\zeta|\cos(\alpha+\beta),-\sin(\alpha+\beta)]$$

Now set the MZI 200d to the bar state and measure the output phase once more. We obtain:

$$\arg E_{top,\theta=\pi}=\psi+a\tan 2[-|\zeta|\sin(\alpha-\beta),-\cos(\alpha-\beta)]$$

Solving this system of equations provides $\psi$; using this information, we can now program any arbitrary external phase shift $\phi$ using the external phase shifter 210.

FIG. 2C illustrates how the single-MZI calibration of FIG. 2B can be applied iteratively to the network of MZIs 200a-200e in the programmable photonic circuit 220. Calibrating the entire programmable photonic circuit 220 starts with calibration of the devices connected directly to the detectors 240 at the circuit output, which in a rectangular unitary circuit corresponds to the devices in the last column of the circuit. Characterizing $\theta$, $\phi$, $\alpha$, $\beta$ for the MZIs connected directly to photodetectors 240 (here, MZI 220d). We can therefore directly obtain the unitary $U_1$ corresponding to the last column of the circuit. With this information, we can now directly obtain the fields exiting an MZI in the preceding column $U_2$ (e.g., MZI 200b) by using homodyne detection with the LO to reconstruct the output field amplitude vector y; the fields exiting this MZI in the penultimate column can be back-calculated to be $U_1^\dagger y$.

The characterization therefore proceeds one column at a time, starting from the output (right) side and working backwards towards the input (left). Homodyne detection with the LO allows direct measurement of fields exiting any MZI 200 in the network; for an MZI in column k, the fields exiting that column will be $\Pi_{k-1}^1 U_i^\dagger y$. Each device 200 is calibrated as before; however, instead of directly measuring photocurrents $I_1$, $I_2$, the output fields at each device 200 are inferred with homodyne measurements of y.

This calibration process works with a rectangular mesh as shown in FIG. 2C and can be applied to any arbitrary network of MZIs. The generalized procedure is to first characterize all devices directly connected to the output detectors. Using this information, MZIs one device removed from the outputs can then be characterized. This enables calibration of MZIs two devices removed from the outputs, and so on, until all devices within the circuit are characterized. However, the symmetry of triangular (Reck) circuits enables a greatly simplified calibration procedure described here. In particular, a Reck circuit be calibrated using direct detection instead of homodyne detection.

Figure 3:
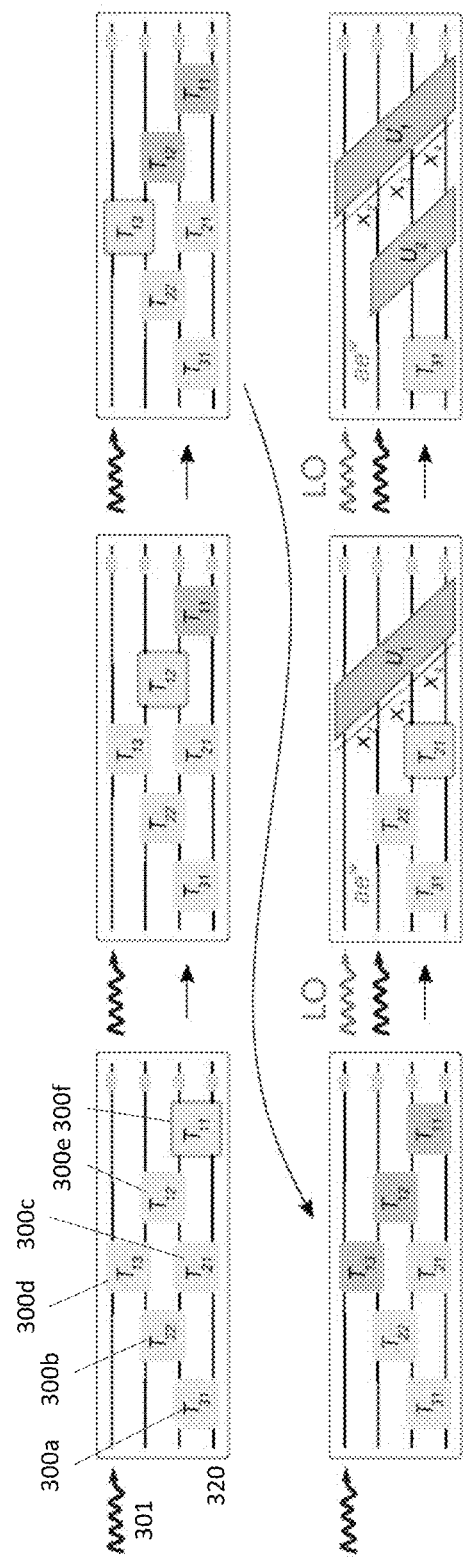
FIG. 3 shows a simplified calibration procedure for a 4×4 Reck (triangular) circuit. Since each device is located along a diagonal, we can guarantee $\zeta=0$ (i.e., no spurious light is scattered into the other input) and extract $\alpha$ and $\beta$ from direct extinction ratio measurements. Once the first diagonal $U_1$ has been calibrated, we can program it to operate as an effective homodyne detector. Any other device in the circuit can be calibrated by interfering the output with $U_1$.

FIG. 3 illustrates a simplified procedure for calibrating a Reck programmable photonic circuit 320 with MZIs 300a-300f. Each diagonal of the circuit 320 can be divided into sub-blocks $U_1, U_2, \ldots, U_N$ which are characterized in order. For each block, the MZIs 300a-300f are characterized starting at the end of the chain and working backwards.

The first device 300f, with transmission matrix $T_{11}$, is characterized by inputting light 301 into the first port of the circuit. Both outputs of the first device 300f are directly connected to detectors (not shown), and the triangular structure of the network 320 ensures that no light scatters into the bottom input, i.e., $\zeta=0$. This simplifies the procedure in at least two aspects. First, the first device's internal phase shifter can be calibrated by directly optimizing transmission vs. the internal phase shift, $\theta$, rather than having to first average transmission over the external phase shift, $\phi$. Second, sweeping transmission vs. the internal phase shift, $\theta$, and computing the extinction ratio for the bar and cross ports gives the following expressions, which can be directly solved to find $|\alpha\pm\beta|$:

$$ER_{top} = \frac{I_{top,max}}{I_{top,min}} = \frac{\cos^2(\alpha-\beta)}{\sin^2(\alpha+\beta)}$$

$$ER_{bottom} = \frac{I_{bottom,max}}{I_{bottom,min}} = \frac{\cos^2(\alpha+\beta)}{\sin^2(\alpha-\beta)}$$

The signs of $\alpha$ and $\beta$ can be determined interferometrically with the same approach as used in the generalized protocol shown in FIGS. 2B and 2C.

The second MZI 300e, with transmission matrix $T_{12}$, has a top port directly connected to a detector (not shown), while the output fields of the bottom port are determined by undoing the known operation $T_{11}^\dagger$. For the third device 300d, with transmission matrix $T_{13}$, the fields exiting the bottom port are computed using $T_{11}^\dagger$, $T_{12}^\dagger$, and so on for the first diagonal.

Once the first diagonal has been characterized, it can be programmed as a homodyne detector for the remainder of the circuit calibration. This is achieved by inputting an LO with a known field $\alpha e^{i\psi}$ into the first port and programming $U_1$ to distribute equal power to all of the MZIs 300d-300f. Suppose we wish to measure the fields $x_2, x_3, \ldots, x_N$ exiting $U_2$. Upon programming $U_1$, the fields exiting the circuit are $U_1(a+x)=U_1([\alpha e^{i\psi}, 0, 0, \ldots, 0]^T+[0, x_2, x_3, \ldots, x_N]^T)$. Since $U_1$ is programmed to distribute the LO signal equally to all outputs $y_i$, i.e., $U_1 a = (\alpha e^{i\psi}/\sqrt{N})[1, 1, \ldots, 1]^T$, the field intensity $|y_i|^2$ at any port i should be:

$$|y_i|^2 = \frac{|a|^2}{N} + |U_1 x|_i^2 + \frac{2a}{\sqrt{N}} \text{Re}\left[e^{-i\psi} U_1 x\right]_i$$

Taking measurements at $\psi=0, \pi/2$ extracts the in-phase and quadrature components of $U_1 x$. This approach enables measurement of field amplitudes anywhere within the circuit; using it, we can characterize the remainder of the circuit $U_2, U_3, \ldots, U_N$ with intensity measurements only.

Once the errors in the phase shifters and beam splitters of the MZIs have been determined, they can be stored in a lookup table or other memory for determining corrected internal and external phase shifts that compensate for the errors. These errors can be used to convert the settings for executing an arbitrary function with a network of ideal MZIs into corresponding settings for a network of imperfect devices.

Figure 4A:
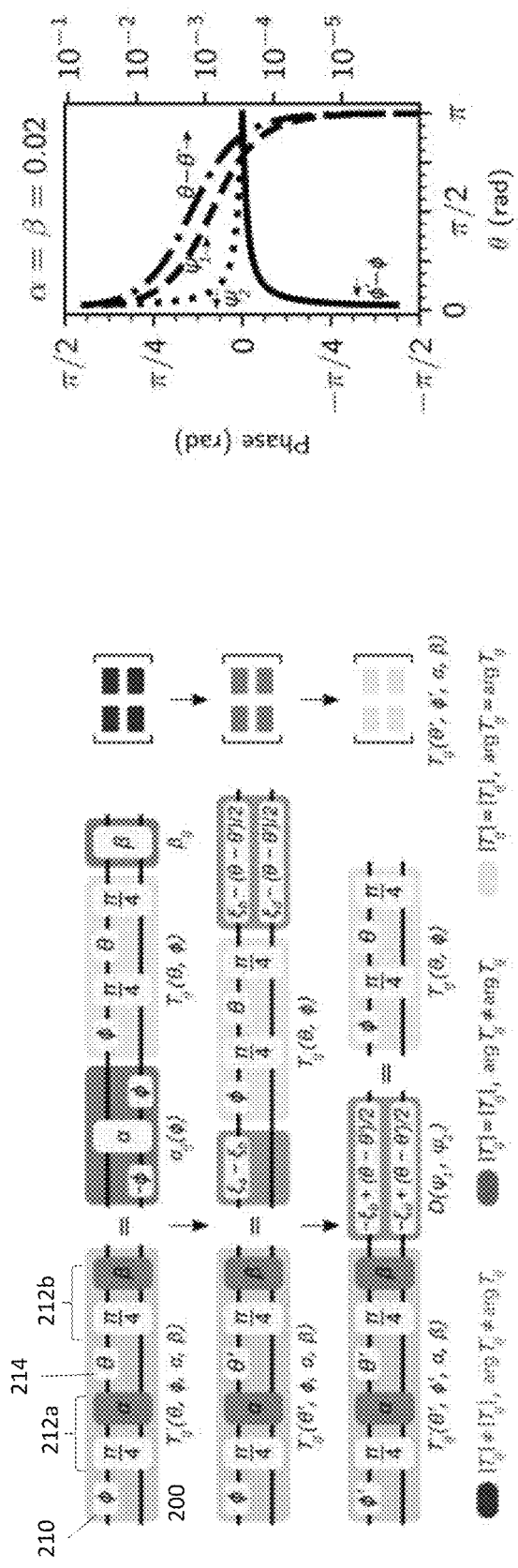
FIG. 4A shows how fabrication-induced errors within each MZI can be corrected by applying local corrections $\theta \rightarrow \theta'$, $\phi \rightarrow \phi'$ to the device. We first correct $\theta$ to set the magnitudes of the elements of $T_{ij}$ equal to $T_{ij}'$. Once the amplitude terms are set correctly, we apply phase corrections to the input and outputs of the device to correct phase errors between $T_{ij}$ and $T_{ij}'$.

FIG. 4A illustrates a process for determining corrected internal and external phase shifts for the actual (imperfect) MZI 200 of FIG. 2B. The external phase shifter 210, beam splitters 212, and internal phase shifter 214 are represented by their nominal phase shifts and errors. The process begins with finding a corrected or adjusted internal phase shift $\theta'$ such that $|T_{ij}'(\theta', \phi', \alpha, \beta)|=|T_{ij}(\theta, \phi)|$. ($\phi'$ represents the corrected or adjusted external phase shift.) This condition produces the following expression for $\theta'$:

$$\theta' = 2\sin^{-1}\sqrt{\frac{\sin^2\theta/2 - \sin^2(\alpha+\beta)}{\cos^2(\alpha-\beta) - \sin^2(\alpha+\beta)}} \quad (7)$$

Component errors restrict the range over which $\theta$ is physically realizable. The above expression has a solution only if $\sin^2\theta/2 > \sin^2(\alpha+\beta)$ and if $\sin^2\theta/2 < \cos^2(\alpha-\beta)$. This restricts $\theta$ to the range:

$$2|\alpha+\beta|\leq\theta<2|\arcsin\cos(\alpha-\beta)| \quad (8)$$

Since $\alpha, \beta \approx 0$, this can be approximated as:

$$2|\alpha+\beta| < \theta < \pi - 2|\alpha-\beta| \quad (9)$$

If $\theta$ should be outside this range for the matrix decomposition, the error is reduced or minimized by setting $\theta'=0$ (if $\theta < 2|\alpha+\beta|$) or $\theta'=\pi$ (if $\theta > \pi - 2|\alpha-\beta|$).

Assuming it is possible to physically implement the desired value of $\theta'$, the magnitudes of the elements of $T_{ij}'(\theta', \phi', \alpha, \beta)$ and $T_{ij}(\theta, \phi)$ are now the same, but each element of $T_{ij}'$ has an undesired extraneous phase $\xi_a, \xi_b, \xi_c, \xi_d$ relative to the corresponding term in $T_{ij}$ that should be corrected. This extraneous phase can be expressed by rewriting $T_{ij}'(\theta', \phi', \alpha, \beta)$ as $$T_{ij}' = ie^{i\theta'/2}\begin{bmatrix} e^{i\phi'}e^{i\xi_a}\sin\theta/2 & e^{i\xi_b}\cos\theta/2 \\ e^{i\phi'}e^{i\xi_c}\cos\theta/2 & -e^{i\xi_d}\sin\theta/2 \end{bmatrix} \quad (10)$$

$$= ie^{i\theta'/2}\begin{bmatrix} e^{i\xi_b} & 0 \\ 0 & e^{i\xi_d} \end{bmatrix}\begin{bmatrix} e^{i(\phi'+\xi_a-\xi_b)}\sin\theta/2 & \cos\theta/2 \\ e^{i(\phi'+\xi_a-\xi_b)}\cos\theta/2 & -\sin\theta/2 \end{bmatrix}$$

where the simplification in the second line originates from unitarity requiring that $\xi_a+\xi_d=\xi_b+\xi_c$. We correct the phase errors in $T_{ij}'$ by setting $\phi'=\phi+\xi_b-\xi_a$ and by applying additional phases $\psi_1=-\xi_b+(\theta-\theta')/2$, $\psi_2=-\xi_d+(\theta-\theta')/2$ to the top and bottom output modes, respectively. Applying these corrections should set $T_{ij}'(\theta', \phi', \alpha, \beta)$ exactly equal to $T_{ij}(\theta, \phi)$.

Expressions for the phase errors $\xi_a, \xi_b, \xi_d$ can be constructed by observing that the elements of $T_{ij}$ should be purely real (i.e., neither imaginary nor complex). From this, we find that:

$$\phi' = \phi + \arctan\left[\frac{\sin(\alpha-\beta)}{\cos(\alpha+\beta)}\tan\theta'/2\right] + \arctan\left[\frac{\sin(\alpha+\beta)}{\cos(\alpha-\beta)}\cot\theta'/2\right] \quad (11)$$

$$\psi_1 = -\arctan\left[\frac{\sin(\alpha-\beta)}{\cos(\alpha+\beta)}\tan\theta'/2\right] + (\theta-\theta')/2 \quad (12)$$

$$\psi_2 = \arctan\left[\frac{\sin(\alpha+\beta)}{\cos(\alpha-\beta)}\cot\theta'/2\right] + (\theta-\theta')/2 \quad (13)$$

Figure 4B:
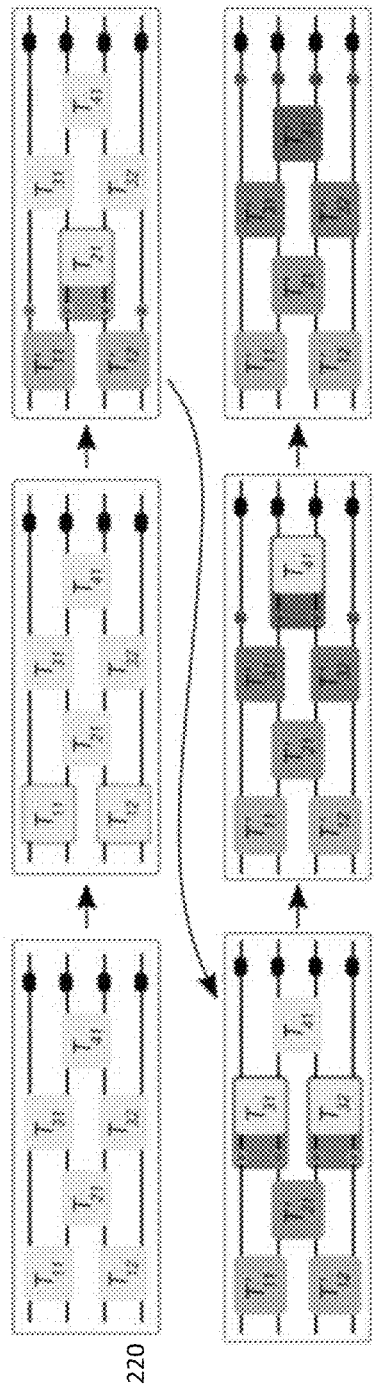
FIG. 4B shows the corrections $\theta \rightarrow \theta'$, $\phi \rightarrow \phi'$, $\psi_1$, $\psi_2$ applied to an MZI with two 52-48 beam splitters ($\alpha=\beta=0.02$).

FIG. 4B shows the errors θ−θ', φ'−φ, ψ₁, ψ₂ as a function of θ for an example MZI with two 52-48 (α=β=0.02) beam splitters. While the corrections to θ and ψ₁ are small (e.g., ~0.1 radian), the errors for φ and ψ₂ are quite substantial. In particular, for low device reflectivities (θ≈0), the phase corrections can exceed 1 radian.

Generally, we cannot apply the auxiliary phases ψ₁, ψ₂ locally to the device being corrected, since the output modes do not have phase shifters. In most cases, one of the two auxiliary phases can be incorporated into the external phase shifter setting of an MZI in the subsequent column. For MZIs in the last column, one of the auxiliary phases can be applied with the phase shifters coupled before the detectors (e.g., phase shifters 230 in FIG. 2A). The other auxiliary phase can be applied by observing that:

$$T_{ij}(\theta,\phi)\begin{bmatrix} e^{i\psi_1} & 0 \\ 0 & e^{i\psi_2} \end{bmatrix} = \begin{bmatrix} e^{i\psi_1} & 0 \\ 0 & e^{i\psi_2} \end{bmatrix} T_{ij}(\theta, \phi+\psi_2-\psi_2) \quad (14)$$

Figure 4C:
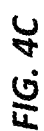
FIG. 4C illustrates a process for programming a unitary with hardware errors on a 4×4 rectangular unitary circuit. We first program each MZI to the ($\theta$, $\phi$) setting obtained with a standard decomposition. Each MZI is then converted $T_{ij} \rightarrow T_{ij}'$ to the settings for an imperfect device one column at a time. At each step, we propagate the output phase shifts $\psi_1$, $\psi_2$ forward in the circuit until the entire network is corrected.

Using this relationship, we can propagate the auxiliary phases forward, through the columns of the network of MZIs, out to the phase shifters D located on the output modes of the circuit. This procedure, illustrated in FIG. 4C, produces a modified output phase screen D' such that:

$$U=D\Pi T_{ij}(\theta,\phi)=D'\Pi T_{ij}'(\theta',\phi',\alpha,\beta) \quad (15)$$

Depending on the component imperfections and the desired value of θ, we may also be able to program θ' such that |T$_{ij}$'(θ', φ', α, β)|=|T$_{ij}$(θ, φ)| if the condition in equation (8) is satisfied. If every MZI in the circuit satisfies the condition in equation (8), we can recover the exact unitary desired. However, if some MZIs in the circuit cannot realize the desired splitting, that exact unitary is not physically realizable by the circuit. In this case, correcting the phases φ', ψ₁, ψ₂ and setting θ' as close to the desired value as possible reduces the gate error ‖DΠT$_{ij}$−D'ΠT$_{ij}$'‖.

We can summarize the process for programming of a matrix U as follows:
1. Calibrate the phase shifter and beam splitter errors α, β with the process given in FIGS. 2B and 2C (or FIG. 3 for triangular circuits) and store the errors in a lookup table;
2. Calculate the values for θ, φ assuming ideal components, using the process described by M. Reck et al., "Experimental realization of any discrete unitary operator," *Physical Review Letters* 73, 58-61 (1994) or W. R. Clements et al., "Optimal design for universal multiport interferometers," *Optica* 3, 1460 (2016), each of which is incorporated herein by reference in its entirety for all purposes;
3. For each device, adjust the internal phase shift θ→θ' using the expression in equation (7). If θ<2|α+β|, set θ'=0; if θ>π−2|α−β|, set θ'=π; and
4. Apply phase corrections φ', ψ₁, ψ₂ as given in equations (11)-(13). Propagate ψ₁, ψ₂ forward to the output phase screen D with the expression in equation (14).

This procedure works for feedforward unitary circuits. The same principles apply for other architectures. Each optical gate within any programmable circuit can be corrected to the desired 2×2 unitary operation T$_{ij}$ with the aforementioned procedure. The expressions provided assume the form for the MZI shown in FIGS. 1A and 2B, but they can be easily modified to apply to other designs, such as the dual-drive tunable basic unit (TBU) used in recirculating architectures.

Correcting the Internal Phase Shifters

In this section, we derive equation (9) above providing the correction to the internal phase shift for an imperfect MZI. Programming a perfect MZI with phase settings (θ, φ) produces the unitary:

$$T_{ij}(\theta,\phi) = ie^{i\theta/2}\begin{bmatrix} e^{i\phi}\sin(\theta/2) & \cos(\theta/2) \\ e^{i\phi}\cos(\theta/2) & -\sin(\theta/2) \end{bmatrix}$$

However, an imperfect MZI splitting errors α, β that is programmed with phase settings (θ, φ) implements the unitary T$_{ij}$'(θ, φ, α, β):

$$T'_{ij}(\theta,\phi,\alpha,\beta) = ie^{i\theta/2}\begin{bmatrix} e^{i\phi}\left(\cos(\alpha-\beta)\sin\frac{\theta}{2}+\right. & \cos(\alpha+\beta)\cos\frac{\theta}{2}+ \\ \left. i\sin(\alpha+\beta)\cos\frac{\theta}{2}\right) & i\sin(\alpha-\beta)\sin\frac{\theta}{2} \\ e^{i\phi}\left(\cos(\alpha+\beta)\sin\frac{\theta}{2}-\right. & -\cos(\alpha-\beta)\sin\frac{\theta}{2}+ \\ \left. i\sin(\alpha-\beta)\cos\frac{\theta}{2}\right) & i\sin(\alpha+\beta)\cos\frac{\theta}{2} \end{bmatrix}$$

The correction θ→θ' can be derived by setting the magnitude of the upper left entry of T$_{ij}$'(θ', φ', α, β) equal that of the upper left entry of T$_{ij}$(θ, φ). For a 2×2 unitary matrix U, the unitarity condition UU† =I implies that setting the magnitudes of one term in both matrices to be equal is sufficient to set the magnitudes of all terms in the matrices to be equal. This condition produces an expression relating θ' to θ:

$$\cos^2(\alpha-\beta)\sin^2(\theta'/2)+\sin^2(\alpha+\beta)\cos^2(\theta'/2)=\sin^2(\theta/2)$$

Solving for θ' yields:

$$\sin^2(\theta'/2) = \frac{\sin^2(\theta/2)-\sin^2(\alpha+\beta)}{\cos^2(\alpha-\beta)-\sin^2(\alpha+\beta)}$$

$$\theta' = 2\arcsin\sqrt{\frac{\sin^2(\theta/2)-\sin^2(\alpha+\beta)}{\cos^2(\alpha-\beta)-\sin^2(\alpha+\beta)}}$$

Since α, β are small, the denominator of the expression for θ' should be positive. This expression should therefore has a solution only when the numerator is positive, i.e., sin² (θ/2)>sin² (α+β), and when the argument in the arcsin function is less than 1, i.e., sin²θ/2 sin² (α+β)<cos² (α−β)− sin² (α+β). These conditions yield the range over which θ is physically realizable:

$$2|\alpha+\beta|<\theta<\pi-2|\alpha-\beta|$$

Perfect Optical Gates with Redundant Devices

Device imperfections limit the range of realizable values for the internal phase shift, θ. For unitary circuits this results in a net increase of ε with N, even with error correction, as more MZIs cannot be programmed to the required splitting. For recirculating waveguide meshes these errors may degrade the fidelity of the bar and cross configurations used to route signals, which induces unwanted crosstalk between systems.

Figure 5:
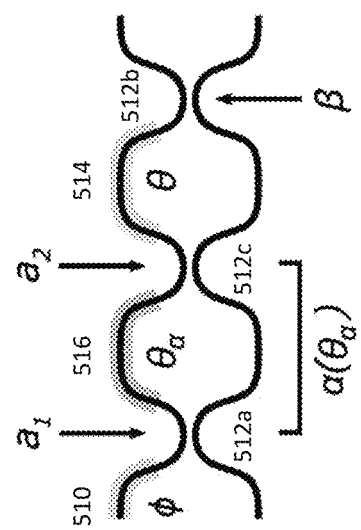
FIG. 5 shows a redundant MZI for realizing perfect unitary optical gates.

FIG. 5 shows a redundant MZI 500 that can be used to realize an ideal optical gate. Like the MZIs described above, the redundant MZI 500 includes an external phase shifter 510, first beam splitter 512*a* with error α₁, second beam splitter 512*b* with error β, and internal phase shifter 514. It also includes an additional internal phase shifter 516 and a third beam splitter 512c with error $\alpha_2$ between the first beam splitter 512a and internal phase shifter 514. The first beam splitter 512a, third beam splitter 512c, and additional internal phase shifter 516 implement a variable beam splitter tunable error $\alpha(\theta_\alpha)$. By setting $\alpha(\theta_\alpha) = -\beta$, we can implement any arbitrary splitting $0 \leq \theta \leq \pi - 4\beta$. Alternatively, we can set $\alpha(\theta_\alpha) = \beta$ to implement any desired splitting $4\beta \leq \theta \leq \pi$. We can then correct for any phase errors using the usual procedure; thus, this interferometer can implement any arbitrary 2×2 unitary and a unitary circuit composed of these devices can always achieve $\epsilon_{corrected} = 0$.

A desired unitary $T_{ij}(\theta, \phi)$ could be obtained by many possible settings ($\theta'$, $\phi'$, $\theta_\alpha$, $\psi_1$, $\psi_2$), since $\alpha(\theta_\alpha)$ is tunable over a wide range. One process for programming the device settings may include the following steps:

If $\theta \lesssim \pi/2$, set $\alpha(\theta_\alpha) = \mp \beta$. Following equation (1) above, program $\theta$ to:

$$\theta_\alpha = 2\arcsin\sqrt{\frac{\sin^2(\pi/4 \pm \beta) - \sin^2(a_1 + a_2)}{\cos^2(a_1 - a_2) - \sin^2(a_1 + a_2)}}$$

As long as $|\beta| < \pi/4 - \max[|\alpha_1 + \alpha_2|, |\alpha_1 - \alpha_2|]$, we can implement any 2×2 unitary. If $\alpha_1 = \alpha_2 = \beta$, this constraint limits the imbalance of each passive splitter to 75-25 or less. This range is slightly smaller than a double MZI but should suffice for any foundry process and has the benefit of using one fewer phase shifter.

If $\theta < \pi/2$, the optical transformation implemented for $\alpha(\theta_\alpha) = -\beta$ is:

$$ie^{i\left(\xi_3 + \frac{\theta_\alpha}{2}\right)} \begin{bmatrix} \cos\left(\frac{\pi}{4} + \beta\right) & i\sin\left(\frac{\pi}{4} + \beta\right) \\ i\sin\left(\frac{\pi}{4} + \beta\right) & \cos\left(\frac{\pi}{4} + \beta\right) \end{bmatrix} \begin{bmatrix} e^{i(\theta' + \xi_2 - \xi_3)} & 0 \\ 0 & 1 \end{bmatrix}$$

$$\begin{bmatrix} \sin\left(\frac{\pi}{4} + \beta\right) & \cos\left(\frac{\pi}{4} + \beta\right) \\ \cos\left(\frac{\pi}{4} + \beta\right) & -\sin\left(\frac{\pi}{4} + \beta\right) \end{bmatrix} \begin{bmatrix} e^{i(\phi' + \xi_1 - \xi_2)} & 0 \\ 0 & 1 \end{bmatrix} = -e^{i(\theta_\alpha + \theta' + \xi_2 + \xi_3 - \pi/2)/2}$$

$$\begin{bmatrix} e^{i\tilde\phi}\cos(2\beta)\cos(\tilde\theta/2) & -\sin(2\beta)\cos(\tilde\theta/2) + i\sin(\tilde\theta/2) \\ ie^{i\tilde\phi}\sin(2\beta)\cos(\tilde\theta/2) + i\sin(\tilde\theta/2) & i\cos(2\beta)\cos(\tilde\theta/2) \end{bmatrix}$$

where:

$$(\tilde\theta, \tilde\phi) = \left(\theta' + \xi_2 - \xi_3 - \pi/2, \phi' + \xi_1 - \xi_2\right) = \left(\arctan\left[\frac{\sin(a_1 + a_2)}{\cos(a_1 - a_2)}\cot\frac{\theta_\alpha}{2}\right],\right.$$

$$\left.\arctan\left[\frac{\sin(a_1 - a_2)}{\cos(a_1 + a_2)}\tan\frac{\theta_\alpha}{2}\right], -\arctan\left[\frac{\sin(a_1 + a_2)}{\cos(a_1 - a_2)}\cot\frac{\theta_\alpha}{2}\right]\right)$$

We derive the settings to program $T(\theta, \phi)$ by following a procedure similar to that described above. We find that:

$$\theta' = 2\arccos(\sec(2\beta)\sin(\theta/2)) + \frac{\pi}{2} + \xi_3 - \xi_2$$

$$\phi' = \phi - \xi_1 + \xi_2 + \arg[-\sin(2\beta)\cos(\tilde\theta/2) + i\sin(\tilde\theta/2)]$$

$$\psi_1 = \arg[\sin(2\beta)\cos(\tilde\theta/2) + i\sin(\tilde\theta/2)] + \frac{1}{2}(\theta - \theta_\alpha - \theta' - \xi_2 - \xi_3) - \frac{5\pi}{4}$$

$$\psi_2 = \frac{\pi}{4} + \frac{1}{2}(\theta - \theta_\alpha - \theta' - \xi_2 - \xi_3)$$

If $\theta > \pi/2$, i.e $\alpha(\theta_\alpha) = \beta$, then the unitary transformation is instead:

$$-e^{i(\theta_\alpha + \theta' + \xi_2 + \xi_3 - \pi/2)/2}$$

$$\begin{bmatrix} e^{i\tilde\phi}(\cos(\tilde\theta/2) - i\sin(2\beta)\sin(\tilde\theta/2)) & i\cos(2\beta)\sin(\tilde\theta/2) \\ -e^{i\tilde\phi}\cos(2\beta)\sin(\tilde\theta/2) & i\cos(\tilde\theta/2) - \sin(2\beta)\sin(\tilde\theta/2) \end{bmatrix}$$

where $\tilde\theta$, $\tilde\phi$, $\xi_1$, $\xi_2$, $\xi_3$ are defined above. In this case the device settings are:

$$\theta' = 2\arcsin(\sec(2\beta)\cos(\theta/2)) + \frac{\pi}{2} + \xi_3 - \xi_2$$

$$\phi' = \phi - \xi_1 + \xi_2 + \frac{\pi}{2} + \arctan[\tan(\tilde\theta/2)\sin(2\beta)]$$

$$\psi_1 = \frac{1}{2}(\theta - \theta_\alpha - \theta' - \xi_2 - \xi_3) - \frac{3\pi}{4}$$

$$\psi_2 = -\arg[-\sin(2\beta)\sin(\tilde\theta/2) + i\cos(\tilde\theta/2)] + \frac{1}{2}(\theta - \theta_\alpha - \theta' - \xi_2 - \xi_3) + \frac{3\pi}{4}$$

Beam Splitter Error, Phase Error, and Corrected Hardware Performance

The performance of our error calibration and correction processes can be verified through numerical simulations of programmable photonic circuits with fabrication imperfections, or hardware errors, including beam splitter and phase errors. The hardware error $\epsilon$ between a desired unitary matrix U and the implemented matrix $U_{hardware}$ can be quantified by the Frobenius norm:

$$\epsilon = \frac{1}{\sqrt{N}}\left(\sum_{ij}|U_{hardware,ij} - U_{ij}|^2\right)^{1/2}$$

This metric, which is bounded $\epsilon \in [0,2]$, can be interpreted as an average relative error per entry of the matrix U; for example, in a neural network $\epsilon$ would correspond to the average relative error per weight.

Unitary circuits decompose arbitrary matrices into a product of unitary matrices $T_{ij}(\theta, \phi, \alpha, \beta)$:

$$U = D\prod_{ij} T_{ij}(\theta, \phi, \alpha, \beta)$$

where $T_{ij}(\theta, \phi, \alpha, \beta)$ is:

$$\underbrace{\begin{bmatrix} 1 & 0 & \cdots & \cdots & \cdots & 0 & 0 \\ 0 & 1 & \cdots & \cdots & \cdots & 0 & 0 \\ \vdots & & \ddots & & & \cdots & \vdots \\ \vdots & & & e^{i\theta}\cos\left(\frac{\pi}{4} + \beta\right) & i\sin\left(\frac{\pi}{4} + \beta\right) & & \vdots \\ \vdots & & & ie^{i\theta}\sin\left(\frac{\pi}{4} + \beta\right) & \cos\left(\frac{\pi}{4} + \beta\right) & & \vdots \\ \vdots & & & & & \ddots & \vdots \\ 0 & 0 & & & & 1 & 0 \\ 0 & 0 & \cdots & \cdots & \cdots & 0 & 1 \end{bmatrix}}_{H_{2,ij}(\theta,\beta)}$$

-continued $$\underbrace{\begin{bmatrix} 1 & 0 & \cdots & & \cdots & & \cdots & & \cdots & 0 & 0 \\ 0 & 1 & \cdots & & \cdots & & \cdots & & \cdots & 0 & 0 \\ \vdots & & \ddots & & & & & & \ddots & & \vdots \\ \vdots & & & e^{i\phi}\cos\left(\frac{\pi}{4}+\alpha\right) & & i\sin\left(\frac{\pi}{4}+\alpha\right) & & & & & \vdots \\ \vdots & & & ie^{i\phi}\sin\left(\frac{\pi}{4}+\alpha\right) & & \cos\left(\frac{\pi}{4}+\alpha\right) & & & & & \vdots \\ \vdots & & \ddots & & & & & & \ddots & & \vdots \\ 0 & 0 & & & & & & & & 1 & 0 \\ 0 & 0 & \cdots & & \cdots & & \cdots & & \cdots & 0 & 1 \end{bmatrix}}_{H_{1,ij}(\phi,\alpha)}$$

The matrix error induced by a single beam splitter error $\alpha$ can be computed as:

$$\epsilon = \frac{1}{\sqrt{N}}\left(\sum_{ij}|T_{ij}(\theta,\phi,\alpha=0,\beta=0) - T_{ij}(\theta,\phi,\alpha,\beta=0)|^2\right)^{1/2}$$

The Frobenius norm is unitarily invariant, which originates from the cyclic property of the trace; thus, $\epsilon$ can be calculated from the unitary matrix corresponding to the beam splitter error $\alpha,\beta$:

$$\epsilon^2(\alpha) = \frac{1}{N}\sum_{ij}|H_{1,ij}(\phi,\alpha) - H_{1,ij}(\phi,0)|^2$$

$$= \frac{1}{N}\sum_{ij}Tr\left[(H_{1,ij}(\phi,\alpha) - H_{1,ij}(\phi,0))^\dagger(H_{1,ij}(\phi,\alpha) - H_{1,ij}(\phi,0))\right]$$

$$= \frac{1}{N}Tr\left[2I - H_{1,ij}(\phi,\alpha)^\dagger H_{1,ij}(\phi,0) - H_{1,ij}(\phi,0)^\dagger H_{1,ij}(\phi,\alpha)\right]$$

$$= \frac{1}{N}\left(2N - 2\mathrm{Re}\left[Tr[H_{1,ij}(\phi,\alpha)^\dagger H_{1,ij}(\phi,0)]\right]\right)$$

$$= \frac{1}{N}(2N - 2(2\cos\alpha + N - 2))$$

$$= \frac{4}{N}(1-\cos\alpha) \approx \frac{2\alpha^2}{N}$$

Repeating this calculation for $\beta$ yields the same result.

In a unitary circuit with $N(N-1)/2$ interferometers, the average error is therefore:

$$\langle\epsilon\rangle = \sqrt{\frac{N(N-1)}{2}\left[\langle\epsilon^2(\alpha)\rangle + \langle\epsilon^2(\beta)\rangle\right]}$$

$$= \sqrt{(N-1)(\langle\alpha^2\rangle + \langle\beta^2\rangle)}$$

$$= \sqrt{2(N-1)}\,\sigma_{BS}$$

Figure 6A:
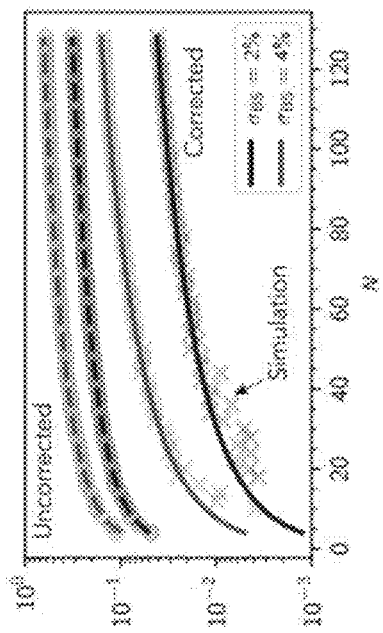
FIG. 6A is a plot of the uncorrected and corrected beam splitter errors (unitless Frobenius norm) as a function of circuit size N. The scatter plot shows the median error for 12 simulations, showing excellent agreement with the derived expressions.

FIG. 6A shows the expression immediately above plotted against simulation results; they show excellent agreement with the derived expression.

In addition to beam splitter errors, there can be errors in the phase shifter settings; however, the primary source of these errors is a static error originating from microscopic changes in waveguide geometry between the interferometer arms. This static error is calibrated out in the first step of the characterization process described above with respect to FIGS. 2B and 2C.

This calibration cannot account for dynamic errors, however. Potential sources of dynamic phase errors include thermal drift, thermal crosstalk between phase shifters, and quantization error. Here, we show that the contribution of these effects to the hardware error is significantly smaller than the static errors considered above.

To start, we find that any error $\Delta$ induced in a single phase setting by these effects can be computed to be:

$$\epsilon^2(\Delta) = \frac{1}{N}\left(2N - 2\mathrm{Re}\left[Tr[H_{2ij}(\theta+\Delta,0)^\dagger H_{2ij}(\theta,0)]\right]\right)$$

$$= \frac{1}{N}(2N - 2(\cos\Delta + N - 1))$$

$$= \frac{1}{N}(2 - 2\cos\Delta)$$

$$= \frac{\Delta^2}{N}$$

We now consider the error induced by each of these effects.

Thermal drift: Typical thermo-electric cooling (TEC) systems can maintain chip temperature stabilities better than <0.01° C. The thermo-optic coefficient dn/dT of silicon is $1.8\times10^{-4}$ K$^{-1}$; for an L=200 µm long phase shifter, a temperature gradient of <0.01° C. therefore induces a phase error of $2\pi(dn/dT)(\Delta T)L/\lambda \approx 1.5\times10^{-3}$ at $\lambda$=1550 nm, which is an order of magnitude smaller than the expected beam splitter error.

Thermal crosstalk: Thermal crosstalk is largely deterministic and dominated by the nearest-neighbor crosstalk, which can be accounted for in the phase shifter characterization. Additionally, crosstalk can be suppressed by spacing interferometers sufficiently apart on the chip; a spacing of 135 µm, for instance, has been measured to generate a crosstalk with the neighboring MZI of less than 0.02 rad/rad. Since thermal crosstalk decays with increasing separation, with careful design this effect should not dominate hardware error.

Quantization error: Quantization error originates from the digital-to-analog converters (DACs) used to program voltages into the phase shifters. Consider an N-bit DAC whose $2^N$ codewords range from zero voltage to the voltage $V_{2\pi}$ required for a $2\pi$ phase shift. Programming the M-th ($0 \leq M \leq 2^N-1$) codeword produces a voltage sampled uniformly over the distribution:

$$V_M = \frac{V_{2\pi}}{2^N}\left(M + \frac{1}{2}\right) \pm \underbrace{\frac{V_{2\pi}}{2^{N+1}}}_{N\text{ bits}}$$

In a thermo-optic phase shifter, relative phase is a function of the voltage squared; the phase setting for the M-th codeword is therefore:

$$\phi_M = \frac{2\pi}{2^{2N}}\left(M + \frac{1}{2} \pm \frac{1}{2}\right)^2$$

$$\approx \frac{2\pi}{2^{2N}}\left(M + \frac{1}{2}\right)^2 \pm \frac{2\pi}{2^{2N}}\left(M + \frac{1}{2}\right)$$

The uncertainty in $\phi$ is maximum at $M=2^N-1$, where the phase setting is:

$$\phi \approx 2\pi \pm \underbrace{\frac{2\pi}{2^N}}_{N-1\text{ bits}}$$

which is one fewer bit of accuracy than for the voltage setting.

The square-law dependence of phase on voltage therefore results in an N-bit DAC setting the phase to roughly N−1 bits of accuracy. A 12-bit DAC should suppress worst-case quantization error per phase shifter to about $9 \times 10^{-4}$, and 16 bits are sufficient to suppress error to below $6 \times 10^{-5}$.

Figure 6B:
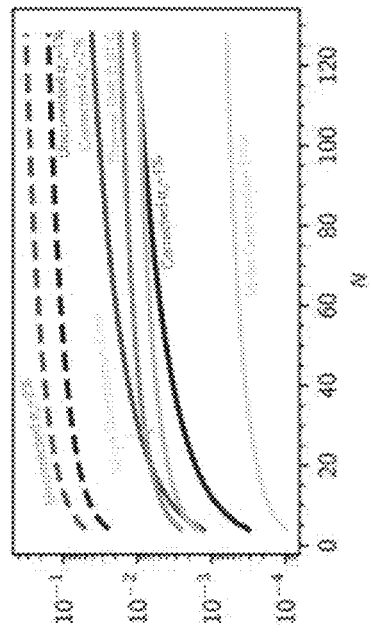
FIG. 6B is a plot of the relative error contributions from beam splitter error, thermal drift, and quantization error as a function of circuit size N. If the component errors are left uncorrected, then even small beam splitter variations may produce errors significantly larger than those produced by dynamic effects. Hardware error correction suppresses these component errors to a point where dynamic effects begin to play an important role, particularly if the digital-to-analog converter (DAC) resolution is low.

FIG. 6B is a plot of the relative error contributions of these effects compared to static beam splitter error. These estimates suggest that uncorrected component imprecision dominates the hardware error in programmable photonic circuits. However, once component errors are corrected, dynamic effects may play a more significant role in the total hardware error.

As discussed above, if $\theta'$, $\phi'$ are realizable for all devices in a circuit, then $\epsilon_{corrected} = 0$. For large circuit sizes N, however, some devices may require an internal phase shift $\theta$ outside the range of realizable values $2|\alpha+\beta| < \theta < \pi - 2|\alpha-\beta|$.

Consider a device for which we can correct $\phi$, $\psi_1$, $\psi_2$, but are unable to correct $\theta$. Any unitary U can be decomposed into a product of matrices $U = D\Pi T_{ij}$, where D is diagonal and $T_{ij}$ is a N×N block matrix with non-trivial entries:

$$\begin{bmatrix} e^{i\psi_1} & 0 \\ 0 & e^{i\psi_2} \end{bmatrix} \begin{bmatrix} \sin(\theta/2) & \cos(\theta/2) \\ \cos(\theta/2) & -\sin(\theta/2) \end{bmatrix} \begin{bmatrix} e^{i\phi} & 0 \\ 0 & 1 \end{bmatrix}$$

An error $\theta \to \theta + \Delta$ produces a contribution to $\epsilon_{corrected}$ of:

$$\epsilon^2(\Delta) = \frac{1}{N}(2N - 2(2\cos(\Delta/2) + N - 2))$$

$$= \frac{8}{N}\sin^2(\Delta/4) \approx \frac{\Delta^2}{2N}$$

On average, given $\theta$ cannot be realized, $\langle \Delta^2 \rangle = 2 (\langle \alpha^2 \rangle + \langle \beta^2 \rangle) = 4\sigma_{BS}^2$ and the error per device will be $\langle \epsilon^2(\Delta) \rangle = 2\sigma_{BS}^2/N$. The total error for the circuit is therefore:

$$\langle \epsilon_{corrected} \rangle = \sqrt{(N-1)\sigma_{BS}^2 P(\theta < 2|\alpha+\beta|)}$$

where $P(\theta < 2|\alpha+\beta|)$ is the probability that a device in the circuit needs to be programmed to a splitting that cannot be realized.

Figure 6C:
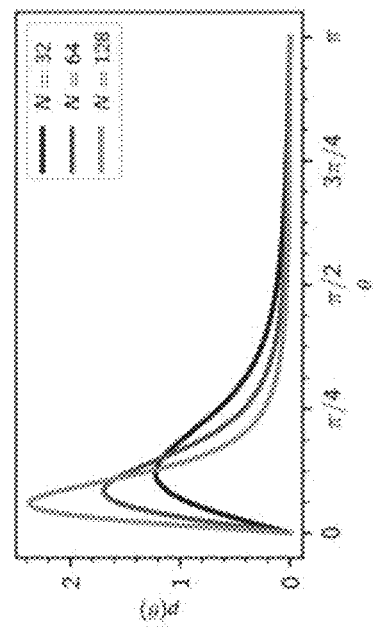
FIG. 6C is a plot of the probability density function of the internal phase shifter setting θ for N={32, 64, 128}. As N increases, ⟨θ⟩ is further biased towards 0.

The distribution of internal phase shifter settings $\theta$ for a unitary circuit can be determined from the Haar measure. For a given MZI:

$$p_{n,i}(\theta) = (n-i)\sin(\theta/2)\cos^{2(n-i)-1}(\theta/2)$$

where $n \in [2, N]$, $i \in [1, N-n+1]$ are indices denoting the position of the MZI in the network. FIG. 6C shows the distribution of $\theta$ over the entire circuit. This distribution can be written as:

$$p(\theta) = \sum_{k=1}^{N-1} \frac{2(N-k)}{N(N-1)} k\sin(\theta/2)\cos^{2k-1}(\theta/2)$$

Integrating this expression yields the fraction of beam splitters with a splitting below $\xi$:

$$P(\theta < \xi) = \sum_{k=1}^{N-1} \frac{2(N-k)}{N(N-1)} \int_0^\xi k\sin(\theta/2)\cos^{2k-1}(\theta/2)d\theta$$

-continued $$= \sum_{k=1}^{N-1} \frac{2(N-k)}{N(N-1)}(1 - \cos^{2k}(\xi/2))$$

$$= \frac{N+1}{N-1} - \frac{4(N + \cot^2(\xi/2)(\cos^{2N}(\xi/2) - 1))}{N(N-1)(1 - \cos\xi)}$$

For small device errors, this probability can be Taylor expanded to:

$$\sum_{k=1}^{N-1} \frac{2(N-k)}{N(N-1)}\left(\frac{k\xi^2}{4}\right) = \frac{N+1}{12}\xi^2 = \frac{2(N+1)}{3}\sigma_{BS}^2$$

On the other hand, the probability that $\theta > \pi - 2|\alpha-\beta|$ is:

$$P(\theta > \pi - 2|\alpha-\beta|) = \sum_{k=1}^{N-1} \frac{2(N-k)}{N(N-1)} \int_{\pi-2|\alpha-\beta|}^\pi k\sin(\theta/2)\cos^{2k-1}(\theta/2)d\theta$$

$$= \sum_{k=1}^{N-1} \frac{2(N-k)}{N(N-1)} \cos^{2k}\left(\frac{\pi}{2} - |\alpha-\beta|\right)$$

$$\approx \sum_{k=1}^{N-1} \frac{2(N-k)}{N(N-1)} 2^k \sigma_{BS}^{2k} \approx \frac{4\sigma_{BS}^2}{N}$$

Figure 6D:
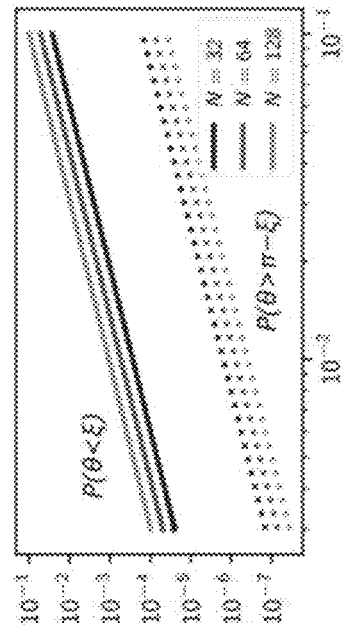
FIG. 6D is a plot of the probability an MZI should be programmed to a splitting θ<2|α+β|, θ>π−2|α−β for N={32, 64, 128}. P(θ>π−2|α−β|) is orders of magnitude smaller than P(θ<2|α+β|) so it can be neglected when computing the expected corrected hardware error.

For moderately large N, this quantity is order of magnitudes smaller than $P(\theta < 2|\alpha+\beta|)$; we can therefore disregard it when estimating the average corrected error, which is plotted in FIG. 6D.

The average corrected error is therefore:

$$\langle \epsilon_{corrected} \rangle = \sqrt{(N-1)\sigma_{BS}^2 P(\theta < 2|\alpha+\beta|)}$$

$$= \sqrt{(N-1)\sigma_{BS}^2 \left(\frac{2(N+1)}{3}\sigma_{BS}^2\right)}$$

$$= \sigma_{BS}^2 \sqrt{\frac{2(N^2-1)}{3}}$$

This expression is plotted in FIG. 6A and also shows excellent agreement with simulation results.

Figures 7A, 7B:
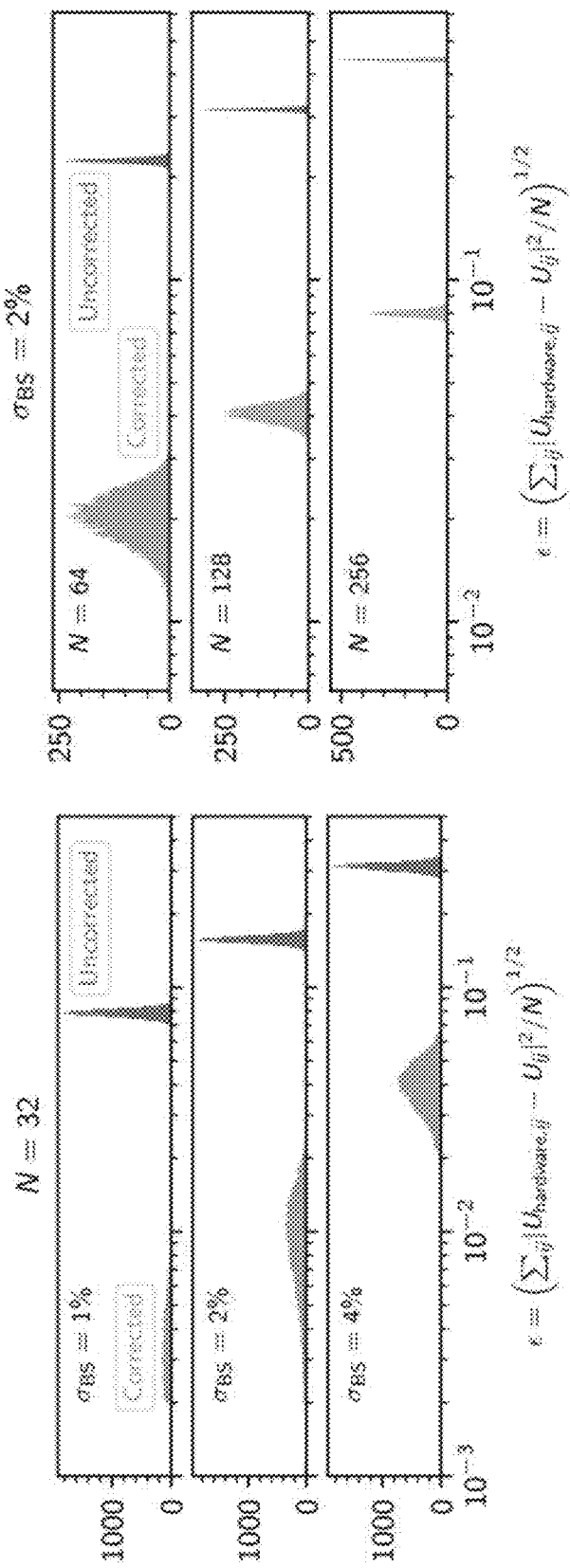
FIG. 7A shows matrix error ϵ before and after correction for 100 random unitaries implemented on 100 random circuits with varying beam splitter statistics.
FIG. 7B shows matrix error ϵ before and after correction for N={64,128,256} with a beam splitter variation $\sigma_{BS}$=2%.

FIG. 7A shows the matrix error $\epsilon = (\Sigma_{ij} |U_{hardware,ij} - U_{ij}|^2 / N)^{1/2}$ for 100 Haar random unitaries implemented on 100 randomly generated N=32-mode unitary circuits with mean beam splitter transmission $\eta = (50 \pm \sigma_{BS})\%$. The beam splitter errors are independently sampled from a Gaussian distribution; for large N, the distribution shape should not greatly affect the results. Error correction reduces $\epsilon$ significantly, sometimes by more than an order of magnitude. This improvement is larger for circuits with small splitting errors, as they are more likely to satisfy Equation (8) and program the desired adjusted internal phase shifts $\theta'$ for the MZIs within the circuit. However, even for circuits with large $\sigma_{BS}$, where many MZIs may not be programmable to the desired internal phase shifts $\theta$, the improvement in $\epsilon$ is substantial as the errors in $\phi$, $\psi_1$, $\psi_2$ can be corrected.

FIG. 7B shows $\epsilon$ with and without error correction for circuit sizes N={64,128,256}. For these simulations, we chose a beam splitter variation of $\sigma_{BS} = 2\%$, which is a typical wafer-level variance. While the improvement in $\epsilon$ diminishes for larger N, there is still substantial improvement gained in our approach for up to 256 modes. For large unitary circuits, most MZIs should be programmed to reflectivities close to θ≈0; the increasing fraction of MZIs that cannot be programmed to the desired splitting accounts for the increase in ϵ with N. Nevertheless, there is some improvement in ϵ, as phase errors introduced by the components can be corrected. These results suggest that substantial performance improvements can still be achieved by error correction for circuits with hundreds of modes, which is well beyond the size of the current state-of-the-art (N=64) in programmable photonics.

Realistic programmable photonic circuits exhibit insertion loss. If the insertion loss is constant and identical for every path through a feedforward circuit, it should not affect its performance, as the transmission is a scalar constant that can be factored out of the circuit's transfer matrix. In practice, however, the loss of each component forms a distribution that results in interfering paths having slightly different transmissivities, resulting in the programmable photonic circuit's transfer matrix being non-unitary.

For feedforward circuits, loss modeling requires a slight correction to the error metric in the expression above for the Frobenius norm. Two matrices U and cU, where c is a scalar constant 0<c<1, are identical from the perspective of hardware performance, but have a Frobenius distance of 1−c. We correct for this by expressing the Frobenius norm as follows:

$$\epsilon = \frac{1}{\sqrt{N}} \min_{c \in [0,1]} \left[ \left( \sum_{ij} |U_{hardware,ij} - cU_{ij}|^2 \right)^{1/2} \right]$$

This expression returns ϵ=0 for two matrices (U, cU). For two unitary matrices (U, $U_{hardware,ij}$), this expression is minimized at c=1 and reproduces our initial expression for the Frobenius norm. In other cases, the error is reduced or minimized at a value c corresponding roughly to the average transmission through all paths in the circuit.

Next, we model the loss within a programmable photonic circuit. Phase shifters in the silicon-on-insulator (SOI) platform have sufficiently improved to induce little-to-no excess insertion loss beyond the waveguide propagation loss. This has been observed for semimetal (e.g., titanium nitride (TiN)) heaters suspended over the waveguide, where the TiN is placed sufficiently distant from the waveguide to not interact with the optical mode, and also for nano-optical electromechanical (NOEM) phase shifters. We can therefore model the insertion loss of each phase shifter as the waveguide propagation loss and the variable optical loss as originating from the wafer-scale distribution of waveguide loss. For the phase shifters, we assume a 400 µm long actuation region.

Our simulations assume three possible loss distributions:
A "conservative" loss distribution, where efficient thermo-optic tuning is realized by driving a current directly into the waveguide to induce Joule heating with a wafer scale loss distribution of 0.23±0.13 dB per heater. This is a relatively high loss per phase shifter, as dopants are introduced directly into the waveguide and interact with the optical mode. We choose an exponentially modified Gaussian distribution for these simulations.

A "typical" loss distribution assuming a TiN heater suspended over the waveguide. The TiN heater can be placed sufficiently distant from the waveguide not to interact with the optical mode. These devices can be optimized to be efficient, but the loss per device can be limited by the waveguide propagation loss. For waveguide loss, we use the wafer-level statistics described in for a ridge (fully-etched) waveguide (2.1±0.25 dB/cm). Assuming a 400 µm long thermal tuner, the loss per heater is 0.084±0.01 dB. This is a conservative estimate of the loss variation for our simulations, as this data is over the wafer-scale, not the die-scale. For these simulations, we assume the distribution to be Gaussian.

A "state-of-the-art" loss distribution based on the improved waveguide loss and uniformity obtained by $H_2$ thermal annealing the waveguides. We assume the circuit uses rib waveguides, which exhibit a reduced loss of 0.1±0.04 dB/cm. This corresponds to a thermal tuner loss of 0.004±0.0016 dB.

For the directional coupler, we assume the loss to originate from waveguide propagation. Assuming a propagation length of 100 µm to ensure that the waveguide bends are adiabatic, the loss per coupler should be 0.021±0.0025 dB for the conservative and typical loss distributions, and 0.001±0.0004 dB for the state-of-the-art loss distribution.

Figures 8A, 8B:
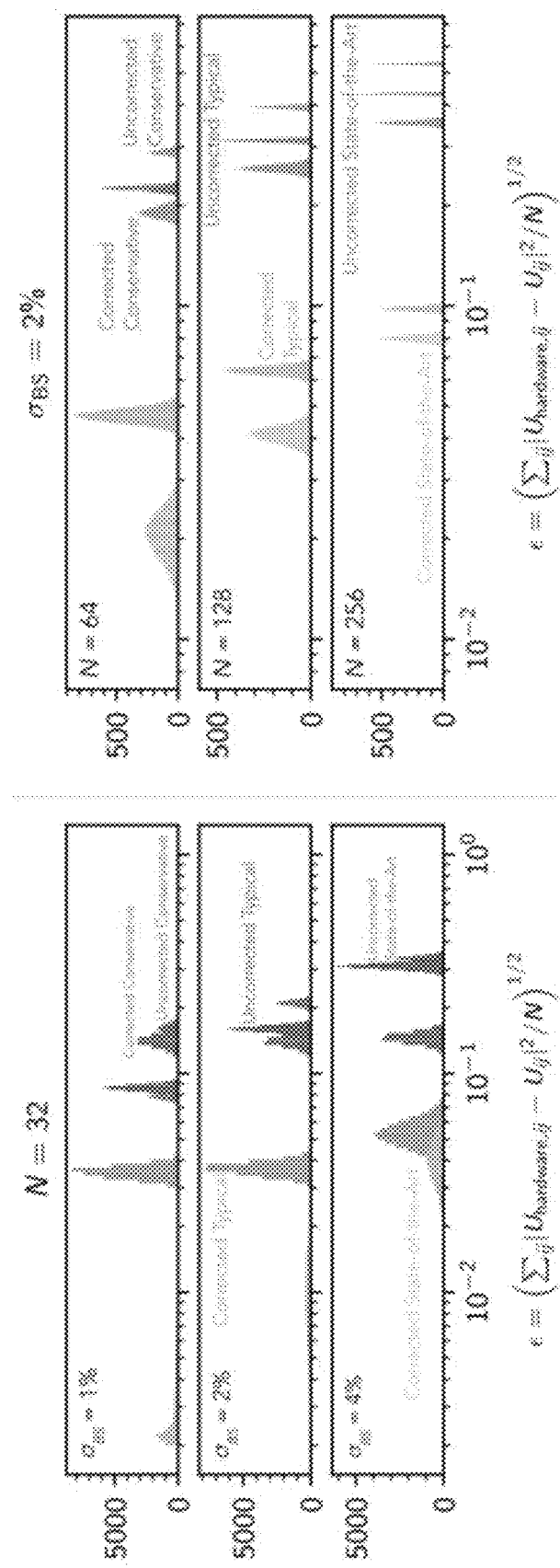
FIG. 8A shows matrix error ϵ for 100 random unitaries implemented on 100 random circuits for N=32 assuming different loss distributions.
FIG. 8B shows matrix error E as a function of N for $\sigma_{BS}$=2% and different loss distributions.

FIGS. 8A and 8B show the matrix error ϵ before and after correction for circuits with variable optical loss. For all loss distributions, the hardware error correction improves ϵ, and the state-of-the-art loss distribution reproduces closely the results presented in FIGS. 7A and 7B for unitary circuits. However, typical loss distributions exhibit a reduced benefit to ϵ from error correction, and a more significant penalty is observed for the conservative distribution. Without being bound by any particular theory, we attribute this drop in performance to non-unitary (loss-induced) errors that cannot be corrected for by adjusting the parameters of each MZI. To confirm this, we attempted to optimize each MZI's phase shifter settings numerically after applying hardware error correction but found improvements in E of less than 1%.

Application: Optical Neural Networks on Feedforward Programmable Circuits

To further benchmark the performance of our error correction protocol, we applied this approach to simulations of a two-layer neural network conducting inference with a feedforward programmable photonic circuit. The architecture of the neural network is one where forward inference is optically computed through passive interference within a unitary photonic circuit coupled with an electrical or electro-optic nonlinearity. Optical machine learning is a key application area for photonic error correction, as model training is both time-consuming and energy intensive, making it impractical to retrain on each individual piece of hardware with a unique set of fabrication errors. Preferably, a model should be highly optimized once in software, after which corrections are applied within the hardware to restore the original software-trained model from any fabrication-induced errors.

The neural networks we benchmark are based on the architecture described in S. Pai et al., "Parallel Programming of an Arbitrary Feedforward Photonic Network," IEEE Journal of Selected Topics in Quantum Electronics 26, 1-13 (2020). Using the Neurophox package, we trained two-layer neural networks with N={36, 64, 144, 256} neurons to recognize low-frequency Fourier features of handwritten digits from the MNIST task. The activation function between layers was assumed to be a modReLU function implemented using an electro-optic nonlinearity.

Figure 9A:
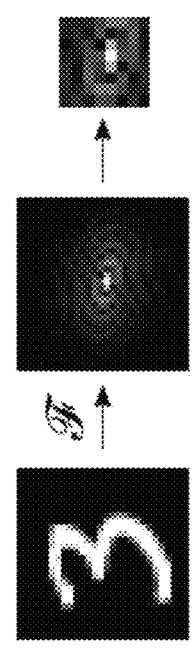
FIG. 9A shows a simulated two-layer optical neural network for the MNIST task. Matrix-vector products are calculated optically in the photonic circuit, and modReLU-like activation functions are implemented electro-optically.
Figure 9A:
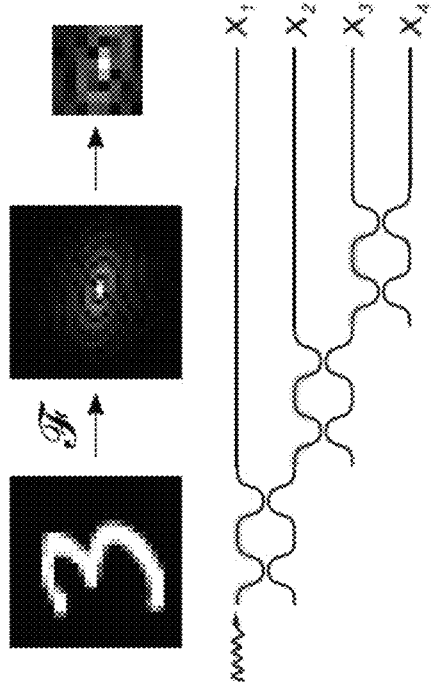
Figure 9B:
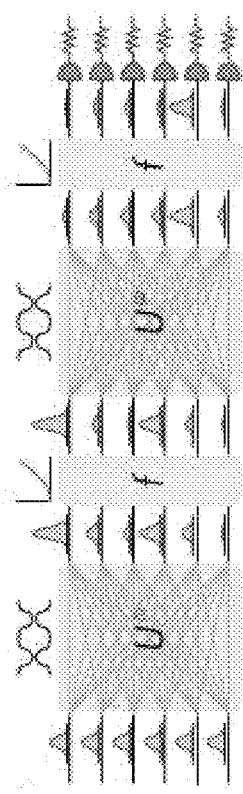
FIG. 9B illustrates how the MNIST data set was pre-processed with a Fourier transform and truncated to a $\sqrt{N}\times\sqrt{N}$ center window for an N-mode unitary circuit. The inputs were normalized to unit length, which can be realized optically with a diagonal line of MZIs.

FIG. 9B illustrates how images of handwritten digits from the MNIST task are pre-processed optically with a diagonal line of MZIs. The MZIs performs a Fourier transform and truncates the result to a $\sqrt{N} \times \sqrt{N}$ center window for a dimension N unitary circuit. We assume a fixed amount of optical power is available to the circuit; each input vector corresponding to an image is normalized to unit length, so that all images are encoded into the neural network with the same amount of optical power.

Figure 9C:
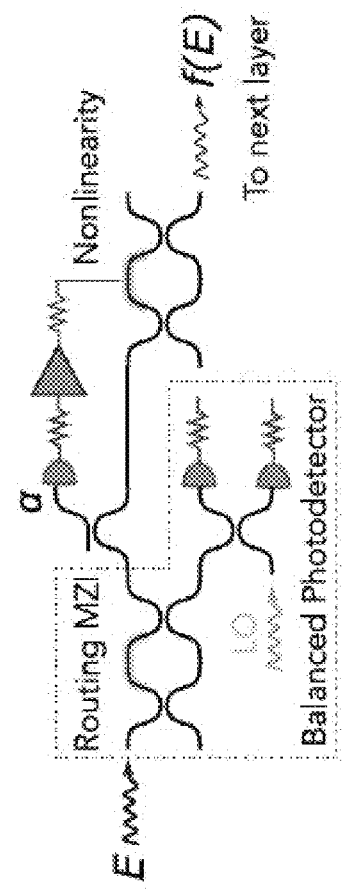
FIG. 9C shows the activation function architecture for the optical neural network. A small fraction a of the input signal is tapped off to a photodiode driving a Mach-Zehnder modulator. It is possible to co-integrate this with a balanced photodetector, shown in the boxed region, which enables calibration of the devices in each unitary circuit layer separately. A routing MZI is used to switch the optical power between the balanced photodetectors during calibration and the nonlinearity during operation.

FIG. 9C shows how neural network's activation function can be realized electro-optically with a tap photodiode coupled to a Mach-Zehnder modulator. The activation function taps off 10% of the input power to the photodiode, while the remainder is directed to the modulator. The photocurrent drives the modulator through a transimpedance amplifier (TIA), resulting in a nonlinear modulation of the electric field.

Figure 9E:
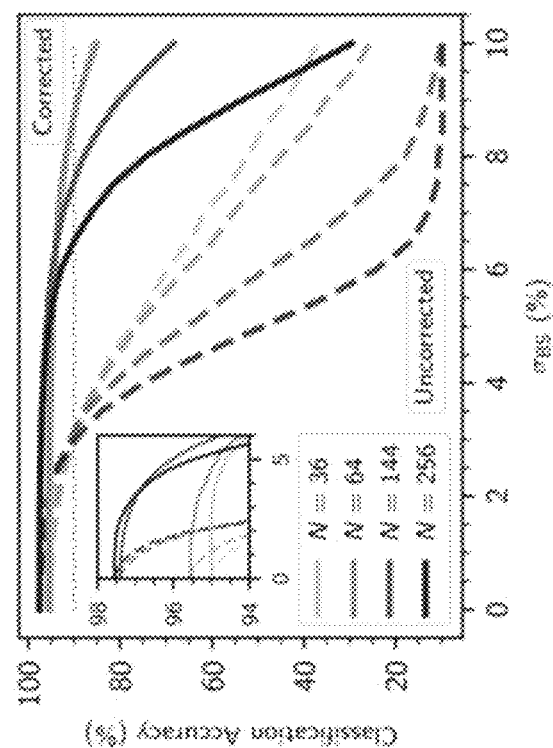
FIG. 9E shows median accuracy for 300 unitary circuits as a function of $\sigma_{BS}$ with and without correction for a photonic image classifier for the MNIST task with N={36, 64, 144, 256} neurons. Error correction significantly improves the fabrication tolerance of the neural network to beyond current-day process tolerances, even for systems with hundreds of modes. As the inset shows, even circuits with 4% beam splitter error preserve the baseline performance within 1%.
Figure 9D:
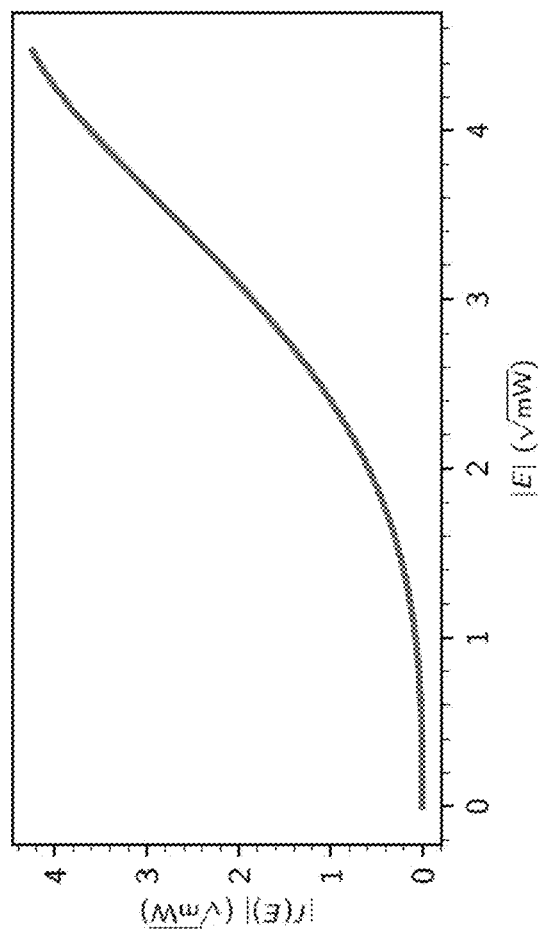
FIG. 9D is a plot of the activation function f(E) for the parameters used in the simulation. Since the hidden layers operate on electric field amplitudes, we plot the square root of the optical power in units $\sqrt{mW}$. Technically, f(E) is non-monotonic for high optical powers, as the Mach-Zehnder interferometer will produce a $\cos(|E|^2)$ modulation. However, the input optical powers in our simulations are chosen to ensure the activation function operates only in the modReLU-like region.
Figure 10A:
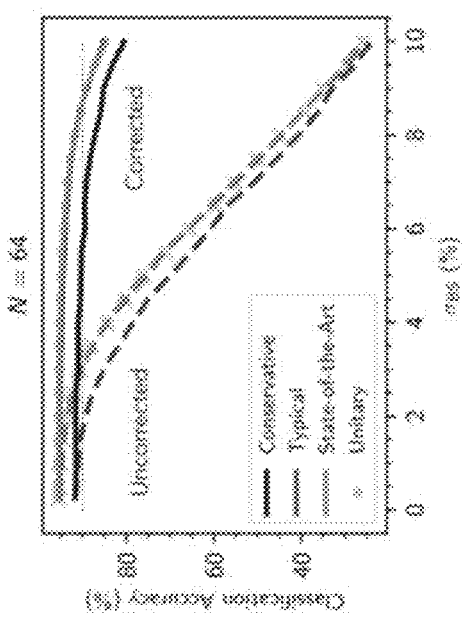
FIGS. 10A-10D are plots of MNIST classification accuracy for the two-layer optical neural network of FIGS. 9A-9E with 36 (10A), 64 (10B), 144 (10C), and 256 (10D) modes assuming variable optical loss. The results for a unitary circuit are plotted for comparison. The typical and state-of-the-art loss distribution results overlap very closely with the results for unitary circuits.
Figure 10B:
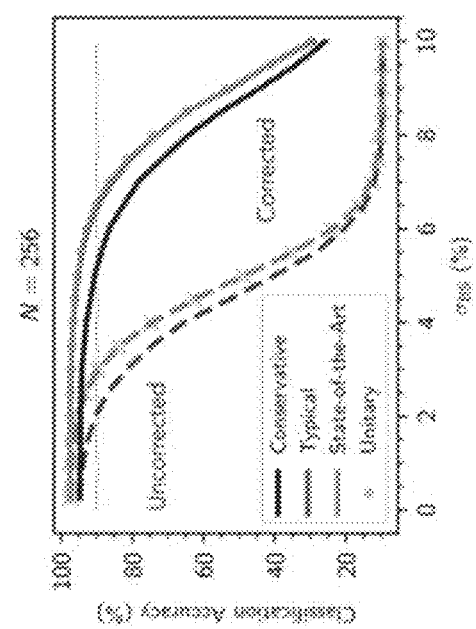
Figure 10C:
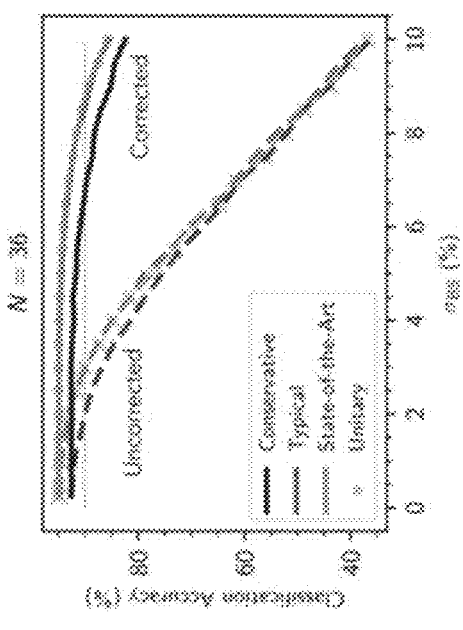
Figure 10D:
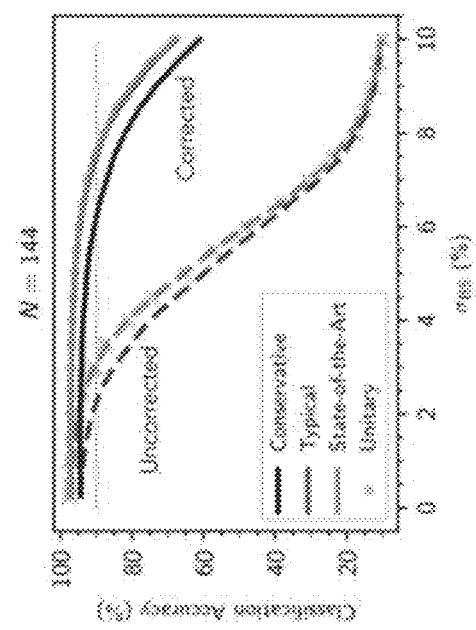

FIG. 9D shows the activation function implemented by the nonlinearity:

$$f(E) = (\sqrt{1-\alpha})e^{-i(g|E|^2/2 + \phi/2 - \pi/2)} \cos(g|E|^2/2 + \phi/2)E$$

where $\alpha=0.1$ is the fractional power tapped off to the photodiode and $g=\pi/20$ is the modulator phase induced when 1 mW is incident upon the nonlinearity (prior to the tap). For typical electro-optic modulator drive voltages of <8 V and a photodiode responsivity of 1 A/W, the required TIA gain for these parameters is roughly 36 dBΩ. The modulator is biased so that no transmission occurs when E=0; as shown in FIG. 9C, for optical powers<20 mW f(E) approximates a modReLU function.

This device can also be co-integrated with a coherent detector, as shown in the boxed region of FIG. 9C, which enables calibration of the device errors within each unitary circuit layer separately. A routing MZI can be used to switch optical power between the detectors during calibration and the nonlinearity during operation.

As the network size N increases, the average power within a waveguide drops as 1/N; for this reason, we assume the total optical power input into the circuit increased commensurately to ensure the activation function could still be triggered. The N={36, 64} networks were trained with 20 mW of optical power, the N=144 network was trained with 40 mW, and the N=256 network was trained with 60 mW of optical power. All of the neural networks were trained to minimize the mean squared error between the $L_2$ normalized output power and the one hot encoding of the correct image.

FIG. 9E shows the median classification accuracy for 300 randomly generated circuits as a function of the beam splitter statistics $\eta=(50\pm\sigma_{BS})\%$. The smaller circuits (N=36, 64) exhibit roughly 95-96% accuracy after training, while the larger circuits (N=144, 256) exhibit a slightly higher model accuracy of about 97%. The larger circuits, however, are less resilient to errors; without error correction, classification accuracy drops to below 90% for all circuit sizes at a splitter variation as low as about 3%.

Photonic error correction extends this cutoff to >6%, which is well above modern-day process tolerances. Moreover, without correction classification, accuracy drops significantly at even typical wafer-level variances (e.g., 2%). With error correction, however, there is little to no drop in accuracy at these variances and less than 1% accuracy loss for beam splitter variations as high as 4%. This margin for fabrication error may prove beneficial as optical neural networks scale up in size. These results suggest that error correction in programmable photonics can enable high-accuracy neural networks of up to hundreds of modes within current-day process tolerances.

FIGS. 10A-10D show the impact of unitary vs. nonunitary errors on this optical neural network for different numbers of modes. The neural network performance for the typical and state-of-the-art distributions are indistinguishable from those for unitary circuits. Moreover, circuits drawn from the conservative distribution perform nearly as well following hardware error correction, despite the apparent drop in effectiveness suggested by FIGS. 8A and 8B. These circuits are slightly less robust to error but can still preserve over 90% accuracy when $\sigma_{BS}$=5%, which is well above typical foundry tolerances. Our results suggest that despite the apparent increase in ε due to optical loss, the benefits of error correction for optical neural networks are nearly unaffected.

Application: Tunable Dispersion Compensators on Recirculating Waveguide Meshes

While our analysis has focused on feedforward programmable photonic meshes, our processes can also be applied to recirculating architectures useful in radio-frequency (RF) and optical signal processing. These recirculating meshes, which are usually configured in hexagonal or triangular lattices, enable implementation of finite impulse response (FIR) and infinite impulse response (IIR) filters by configuring waveguides into asymmetric MZIs and ring resonators, respectively. Unlike the feedforward architectures, the programming of these structures usually cannot be determined analytically and is instead found through optimization. Since optimization can be time-consuming for complex systems, error correction can enable optimizing these circuit parameters on idealized models and then porting them over to hardware without retraining. As an example, we simulated the performance of an IIR filter functioning as a tunable dispersion compensator (TDC) on a hexagonal waveguide lattice. TDC modules are of interest for numerous applications, including compensating chromatic dispersion in optical communication links and enabling high-dimensional quantum key distribution (QKD) with temporal modes.

Figure 11C:
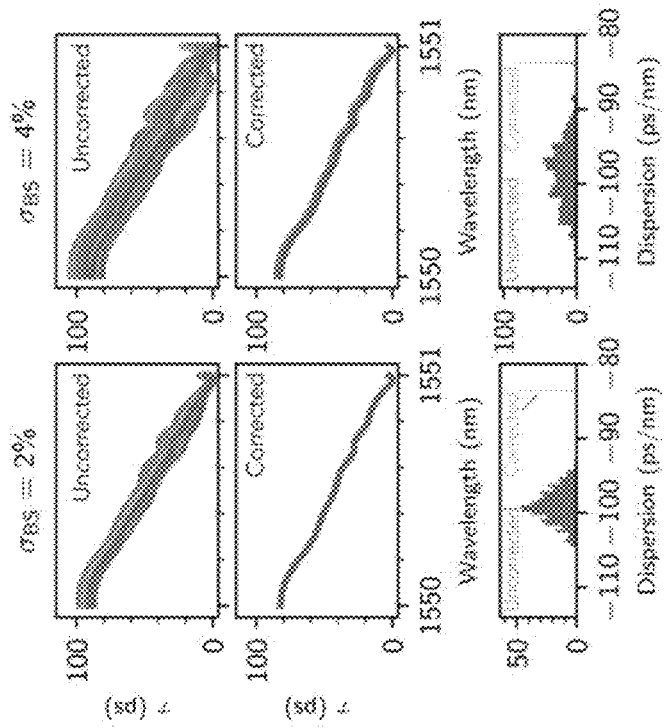
FIG. 11C illustrates simulated performance of the TDC in FIG. 11A. After training the mesh parameters to implement a fixed linear group delay dispersion on an ideal model, small beam splitter errors will introduce variations in the implemented group delay τ profile. Plotted are the group delay profiles for 500 randomly generated circuits before and after correction. Correcting the settings of each TBU restores the desired performance, eliminating the need to retrain on the hardware. Also displayed is the distribution of the group delay dispersion before and after correction.
Figure 11A:
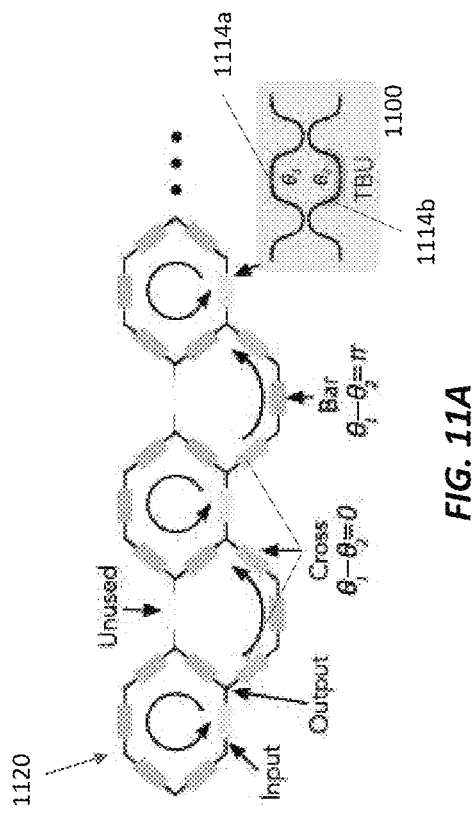
FIG. 11A illustrates a tunable dispersion compensator (TDC) implemented on a recirculating waveguide mesh with 15 tunable-coupling ring resonators coupled serially to one another.

FIG. 11A shows the tunable-coupling ring array architecture of the simulated TDC 1120. Programmable dispersion is achieved by individually tuning the coupling and resonance of each ring in a chain of 15 resonators coupled serially to one another. Each ring is implemented with a single MZI 1100 (often referred to as the tunable basic unit, or TBU) in a hexagonal mesh acting as the coupler, while five other TBUs 1100 are programmed to the bar state to implement feedback. In this case, the MZIs 1100 have two internal phase shifters 1114a and 1114b, with one in each interferometer arm, to apply internal phase shifts of $\theta_1$ and $\theta_2$, respectively. For simplicity, we do not simulate routing within the hexagonal mesh, but instead simulate the transfer function of each individual filter implemented using TBUs 1100 with fabrication imperfections. Using constrained optimization by linear approximations (COBYLA), we trained the TBU parameters on an idealized model to implement a group delay dispersion of −85 ps/nm over the bandwidth of a 50 GHz ITU channel.

Figure 11B:
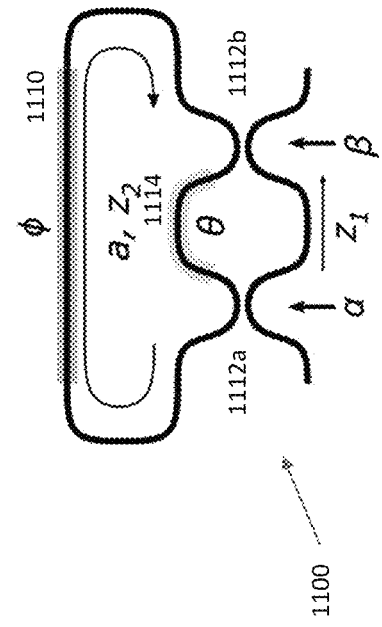
FIG. 11B shows a model for a tunable coupling ring in the TDC of FIG. 11A. The ring coupling is set by an MZI with errors α and β and internal phase θ, and the resonance is set with a phase setting ϕ. The coupler is assumed to be lossless, and the feedback loop is assumed to have a round-trip transmission α.

FIG. 11B illustrates a tunable coupling ring in the array of FIG. 11A. The ring coupling is set by an MZI 1100 with beam splitters 1112a and 1112b (with errors α and β, respectively) and an internal phase shifter 1114a with an internal phase of θ. The resonance is set with an external phase setting φ using an external phase shifter 1110. The coupler is assumed to be lossless, and the feedback loop has a round-trip transmission α.

The transfer function $T_i(\omega)$ of the tunable coupling ring shown in FIG. 11B can be derived with Mason's gain formula:

$$T_i(\omega) = \frac{a_{bot}\tau_1\tau_2 e^{ikz_1} + a_{top}\kappa_1\kappa_2 e^{i(kz_1+\theta)} - a_{loop}a_{top}a_{bot}(\tau_1\tau_2 + \kappa_1\kappa_2)e^{i(k(2z_1+z_2)+\theta+\phi)}}{a_{loop}a_{top}\tau_1\tau_2 e^{i(k(z_1+z_2)+\theta+\phi)} - a_{loop}a_{bot}\kappa_1\kappa_2 e^{i(k(z_1+z_2)+\phi)} - 1}$$

where $k=n(\omega)\omega/c$, $\tau_1=\alpha_{splitter,1}\cos(\pi/4+\alpha)$, $\tau_2=\alpha_{splitter,2}\cos(\pi/4+\beta)$, $\kappa_1=\alpha_{splitter,1}\sin(\pi/4+\alpha)$, $\kappa_2=\alpha_{splitter,2}\cos(\pi/4+\beta)$, $z_1$ is the interferometer arm length, $z_2$ is the length of the feedback loop, and $\alpha_{splitter,1}$, $\alpha_{splitter,2}$, $\alpha_{loop}$, $\alpha_{top}$, $\alpha_{bot}$ are the amplitude transmissions of the first and second splitters, the feedback loop, top arm of the tunable coupler, and bottom arm of the tunable coupler, respectively.

In our simulation, the transfer function $T_i(\omega)$ for each ring was individually computed and multiplied to yield the overall system response $T(\omega)=\Pi_i T_i(\omega)$. From this result we found the group delay of the system $\tau(\omega)=-d/d\omega[\arg T(\omega)]$. The group delay dispersion was calculated with a least squares linear fit to the group delay profile.

FIG. 11C shows simulated group delay $\tau$ profiles for 500 randomly generated TDC modules implemented using TBUs with $\sigma_{BS}=\{2, 4\}\%$ before (top) and after (bottom) error correction. Similar to optical neural networks, precise implementation of a TDC involves accurate phase control throughout the circuit. Fabrication errors introduce spurious phases at each resonance, which results in significant variation of the dispersion profile for even slight component errors. As these results show, correcting the parameters of each TBU locally is sufficient to restore the desired dispersion profile.

While we can correct the coupling and phase parameters for each ring, we cannot correct for errors in the closed feedback loop, which is implemented by setting each TBU to the bar state. Any error $\alpha\neq\beta$ may introduce some loss at each TBU programmed to the bar state, as the bar transmission is reduced to $\cos^2(\alpha-\beta)$. The remainder of the light is directed into unused couplers in the circuit, effectively incurring loss. This alters the critical coupling condition, resulting in the slight spread in the corrected dispersion profile observed for $\sigma_{BS}=4\%$. Our simulations assume a, are independent, Gaussian random variables; in practice, however, $\alpha,\beta$ for a single device are strongly correlated, and the bar state may be nearly perfect. Therefore, these simulations likely overestimate the loss incurred at each TBU programmed to the bar state.

Figure 11D:
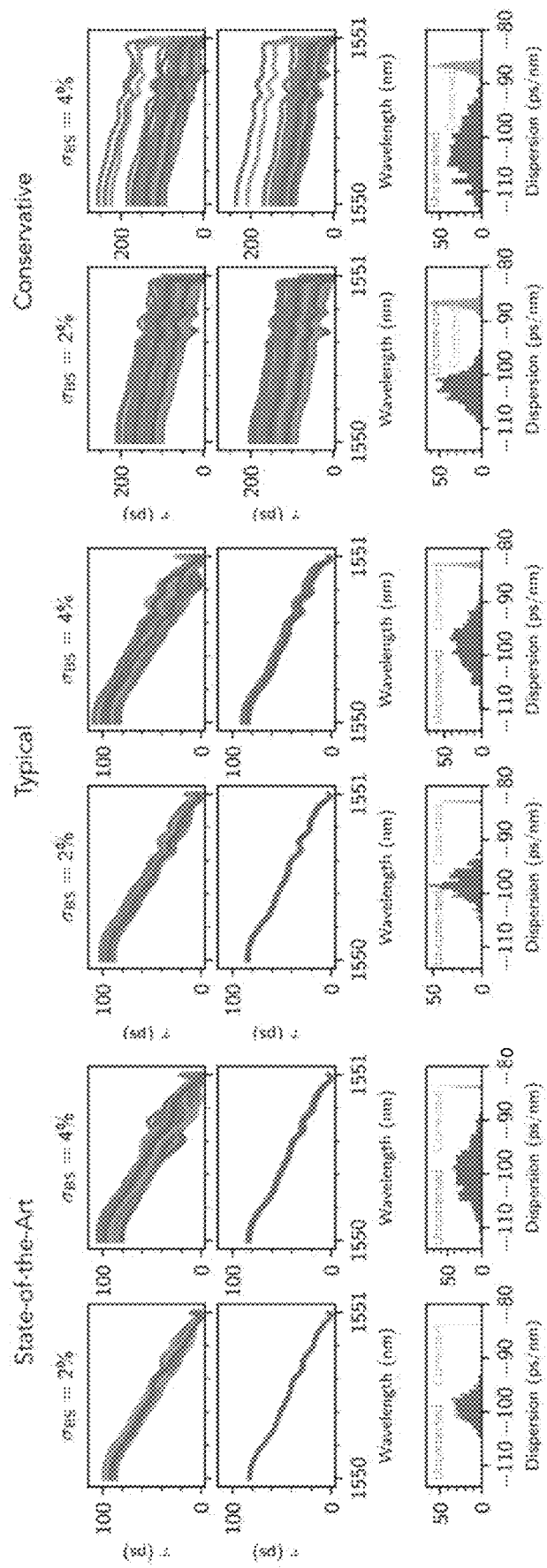
FIG. 11D shows simulations of the TDC in FIG. 11A assuming state-of-the-art, typical, and conservative device losses. The top plots show the group delay profile implemented before and after correction, while the bottom histograms show the group delay dispersion. For all loss distributions hardware error correction obtains the desired group delay dispersion, albeit with some additional spread introduced by the loss within the devices. While the group delay profiles for circuits drawn from the conservative distribution appear to show little effect from error correction, it still recovers the required group delay dispersion with high accuracy.

FIG. 11D shows simulated group delay profiles for a TDC with state-of-the-art, typical, and conservative loss distributions. The typical and state-of-the-art distributions match well with the lossless results presented in FIG. 11C. For the conservative distribution, there still remains significant variation in the group delay profile after correction; however, as the histogram shows, optical loss appears to introduce only a static group delay and does not affect the group delay dispersion. This is likely due to the changes in resonator coupling induced by device loss, and is particularly significant for the conservative case, where an average of 0.23 dB insertion loss per phase shifter would imply an additional ~1 dB loss in the feedback loop. However, even for this case, the error in the group delay dispersion is greatly reduced after correction.

Scalability and Outlook

We have presented an approach for characterizing and correcting for hardware errors in programmable photonic circuits. To conclude, we analyze the expected improvement our technique enables and how it should perform as these circuits scale up.

For a unitary photonic circuit, applying the Reck or Clements decompositions produces an average matrix error $\epsilon$ of:

$$\langle\epsilon\rangle \approx \sigma_{BS}\sqrt{2(N-1)}$$

If we can correct all errors in $\theta$, then $\epsilon_{corrected}\to 0$. We can therefore estimate the expected $\epsilon_{corrected}$ by computing the fraction of MZIs that cannot be programmed to the desired splitting value, i.e., the condition in equation (8).

The distribution of phase shifter settings for a unitary circuit can be related to the Haar measure on the unitary group. The probability an MZI is programmed to a value $\theta<\xi$ is:

$$P(\theta<\xi) = \sum_{k=1}^{N-1}\frac{2(N-k)}{N(N-1)}(1-\cos^{2k}(\xi/2))$$

$$\approx \frac{N+1}{12}\xi^2$$

We disregard the probability an MZI is programmed to a splitting $\theta>\pi-2|\alpha-\beta|$, which is negligibly small for large N. Error correction cannot fix the splitting error if $\theta<2|\alpha+\beta|$; therefore:

$$\langle\epsilon_{corrected}\rangle \approx \left(\frac{1}{2}P(\theta<2|\alpha+\beta|)\langle\epsilon^2\rangle\right)^{1/2}$$

$$= \sigma_{BS}^2\sqrt{\frac{2(N^2-1)}{3}}$$

We find that error correction effectively reduces the hardware error from $\epsilon$ to $\approx(1/\sqrt{6})\epsilon^2$. The expected error improvement is:

$$\frac{\langle\epsilon\rangle}{\langle\epsilon_{corrected}\rangle} \approx \frac{\sqrt{3}}{\sigma_{BS}\sqrt{N}}$$

Figure 12A:
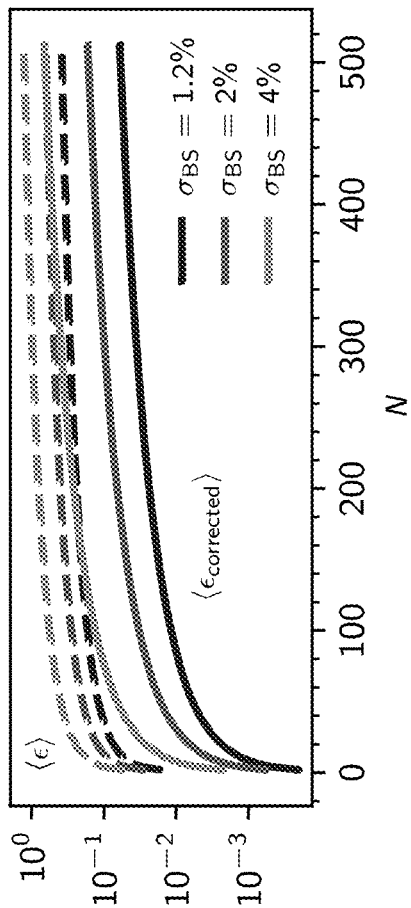
FIG. 12A is a plot of ⟨ϵ⟩, ⟨$\epsilon_{corrected}$⟩ as a function of circuit size N for $\sigma_{BS}$={1.2, 2, 4}%.

FIG. 12A shows $\kappa\epsilon\Lambda$ and $\kappa\epsilon_{corrected}\Lambda$ as functions of N. We consider $\sigma_{BS}=1.2\%$, which is the state-of-the-art, as well as more relaxed tolerances $\sigma_{BS}=\{2, 4\}\%$. For $\sigma_{BS}$ as high as 4%, error correction produces at least a factor of two (and often more) improvement in the error for circuits as large as N=500. We therefore expect our approach to have wide applicability in the near term as the size of programmable photonic circuits scale up.

Error correction also greatly improves the optical bandwidth of unitary circuits. Since directional couplers tend to be highly wavelength sensitive, dense wavelength-division multiplexing (DWDM) typically involves re-fabricating the same circuit with components optimized at each wavelength channel. Our approach, however, enables the use of the same hardware across a wide wavelength range.

Figure 12B:
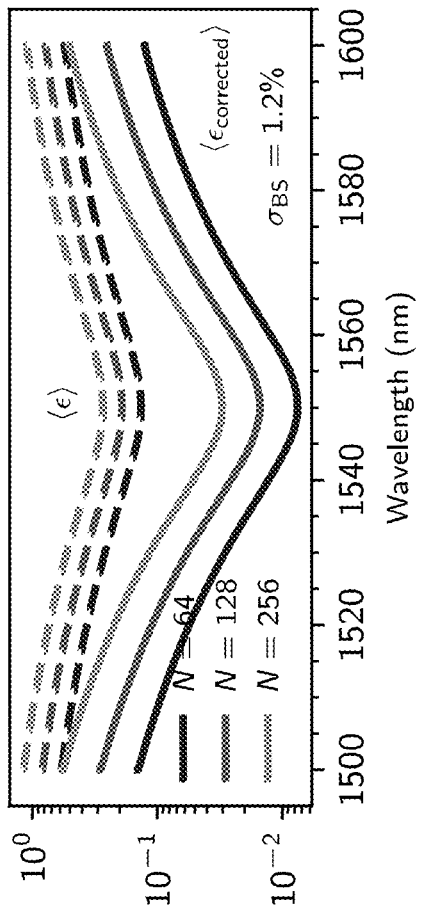
FIG. 12B is a plot of average circuit error as a function of wavelength for N={64, 128, 256} using a directional coupler designed to increase or maximize fabrication robustness.

FIG. 12B shows the expected hardware errors for large circuits across a 100 nm bandwidth using an optimal splitter ($\sigma_{BS}=1.2\%$). This optimal splitter operated as a 50-50 splitter at $\lambda_0=1550$ nm with a wavelength-dependent cross coupling of:

$$T(\lambda) = \sin^2\left[\frac{\pi}{4}\left(\frac{\Delta n(\lambda)}{\Delta n(\lambda_0)}\right)\left(\frac{\lambda_0}{\lambda}\right)\right]$$

Figure 12C:
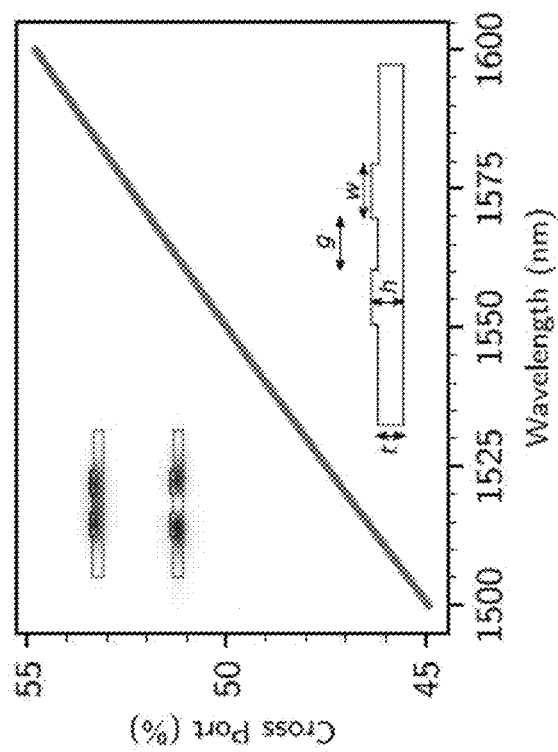
FIG. 12C is a plot of cross-coupling versus wavelength for the optimal directional coupler of FIG. 12B.

(FIG. 12C is a plot of the cross-coupling versus wavelength.) The corrected error for an N=256 circuit across a 60 nm bandwidth (1520-1580 nm) is lower than the uncorrected error at the design wavelength $\lambda=1550$ nm. Even lower errors could be achieved using multimode interference (MMI) couplers; these devices have large bandwidths but often suffer from static splitting imbalances, i.e., $\alpha,\beta$ are invariant to wavelength, but $\langle\alpha\rangle$, $\langle\beta\rangle \neq 0$. A circuit with large-bandwidth MMI couplers can thus use error correction to achieve a large instantaneous bandwidth, for instance, to compute over many parallel wavelength channels.

The results in FIG. 12A suggest a fundamental error bound achievable with local correction for unitary circuits. Our approach yields comparable results to those achieved with self-configuration procedures but does not require a specific structure for the circuit or photodiodes within each device. If the condition in Equation (8) is satisfied, local correction yields $\epsilon_{corrected}=0$ in $O(1)$ time. If this condition is not satisfied, it is sometimes possible to achieve a larger reduction in error with a global optimization approach. However, these approaches, which use photodiodes within each device or output measurements whose number scale nonlinearly with the number of modes, become increasingly inaccessible experimentally as the number of modes increases. Local correction uses minimal overhead and can guarantee a minimum error given certain guarantees on the component performance, making it ideal for standardizing performance across large numbers of chips.

Moreover, this error bound applies only to feedforward, unitary circuits with no redundant devices. $\epsilon$ lower than this bound can be achieved by incorporating additional, redundant MZIs; for instance, one can implement "perfect" optical gates by incorporating an additional phase shifter in an MZI to form a "one-and-a-half MZI" as shown in FIG. 5 (described above). This device can be trained to implement any desired unitary $T_{ij}(\theta, \phi)$ perfectly. The error correction formalism enables calculation of these settings analytically. One of the two constituent splitters is a passive component with error $\beta$, while the other splitter is an MZI that implements a tunable error $\alpha(\theta_\alpha)$. Any desired 2×2 unitary with a required splitting $\theta$ can then be implemented by setting $\theta_\alpha$ such that $2\alpha(\theta_\alpha)+\beta|<\theta<2|\alpha(\theta_\alpha)-\beta|$ and correcting the resultant phase errors.

Not all optical gates within the circuit need to incorporate redundancy. High accuracy unitary circuits have been demonstrated by incorporating only a few extra MZIs into the circuit, which can be trained using nonlinear optimization or gradient descent. Error correction serves an important purpose for these circuits, as one can optimize the hardware settings once on an ideal model and port the settings over to many devices. For recirculating meshes the phase shifter settings are not constrained by the Haar measure, and so the benefit gained from error correction is not expected to diminish with increasing N. We therefore expect error correction to enable scaling up the size of these circuits as well.

Conclusion

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize or be able to ascertain, using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

Also, various inventive concepts may be embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All publications, patent applications, patents, and other references mentioned herein are incorporated by reference in their entirety.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e., "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of correcting individual component errors in a programmable photonic circuit comprising a network of interconnected Mach-Zehnder interferometers arranged in columns, the network of interconnected Mach-Zehnder interferometers comprising auxiliary phase shifters at outputs of the network of interconnected Mach-Zehnder interferometers and a first Mach-Zehnder interferometer having outputs coupled to respective photodetectors and a second-to-last column with a second Mach-Zehnder interferometer having outputs coupled to respective inputs of the first Mach-Zehnder interferometer, each Mach-Zehnder interferometer in the network of interconnected Mach-Zehnder interferometers comprising an internal phase shifter in an arm and an external phase shifter at an input or output, the method comprising:
   determining the individual component errors within the first Mach-Zehnder interferometer based on measurements made with the respective photodetectors coupled to the outputs of the first Mach-Zehnder interferometer;
   setting the first Mach-Zehnder interferometer based on the individual component errors within the first Mach-Zehnder interferometer;
   determining the individual component errors within the second Mach-Zehnder interferometer based on measurements made with the respective photodetectors coupled to the outputs of the first Mach-Zehnder interferometer;
   determining external phase shifts and internal phase shifts for respective Mach-Zehnder interferometers in the network of interconnected Mach-Zehnder interferometers that correct the individual component errors for the respective Mach-Zehnder interferometers;
   applying, by the internal phase shifters, the internal phase shifts to the respective Mach-Zehnder interferometers, the internal phase shifts correcting splitting errors induced by the individual component errors;
   applying, by the external phase shifters, the external phase shifts to the respective Mach-Zehnder interferometers, the external phase shifts correcting input phase errors induced by the individual component errors; and
   applying by the auxiliary phase shifters, auxiliary phase shifts to correct output phase errors induced by the individual component errors.

2. The method of claim 1, wherein each internal phase shift is between $2|\alpha+\beta|$ and $\pi-2|\alpha-\beta|$, where $\alpha$ and $\beta$ represent static fabrication errors in beam splitters in the corresponding Mach-Zehnder interferometer.

3. The method of claim 2, wherein each internal phase shift compensates for the static fabrication errors induced by the beam splitters in the corresponding Mach-Zehnder interferometer.

4. The method of claim 1, wherein the auxiliary phase shifters include the external phase shifters of the Mach-Zehnder interferometers in a last column of the network of interconnected Mach-Zehnder interferometers and applying the auxiliary phase shifts comprises modulating an external phase shifter of the first Mach-Zehnder interferometer.

5. The method of claim 1, wherein applying the auxiliary phase shifts comprises propagating the auxiliary phase shifts through the columns of the network of Mach-Zehnder interferometers.

6. The method of claim 1, wherein the programmable photonic circuit is a feedforward programmable photonic circuit and applying the internal phase shifts and/or applying the external phase shifts reduces an error of a matrix operation implemented by the feedforward programmable photonic circuit.

7. The method of claim 1, wherein applying the internal phase shifts and/or applying the external phase shifts increases a fabrication tolerance of an optical neural network computed in the programmable photonic circuit.

8. The method of claim 1, wherein the programmable photonic circuit is a programmable recirculating waveguide mesh and wherein applying the internal phase shifts and/or applying the external phase shifts corrects at least one error in operation of the programmable recirculating waveguide mesh.

9. The method of claim 1, wherein the first Mach-Zehnder interferometer comprises a first beam splitter coupled to the external phase shifter and the internal phase shifter of the first Mach-Zehnder interferometer, and a second beam splitter coupled to the internal phase shifter, and determining the individual component errors within the first Mach-Zehnder interferometer comprises:
   calibrating the internal phase shifter based on light intensity transmitted from a first input of the first Mach-Zehnder interferometer to a first output of the first Mach-Zehnder interferometer as a function of internal phase shift applied by the internal phase shifter of the first Mach-Zehnder interferometer averaged over a range of external phase shifts applied by the external phase shifter;
   determining splitting errors for the first beam splitter and the second beam splitter based on light intensity transmitted from the first input and a second input of the first Mach-Zehnder interferometer to the first output and a second output of the first Mach-Zehnder interferometer as a function of the external phase shift applied by the external phase shifter of the first Mach-Zehnder interferometer at internal phase shifts of 0, $\pi/2$, and $\pi$; and
   calibrating the external phase shifter based on a phase of light transmitted from the first input and the second input of the first Mach-Zehnder interferometer to the first output of the first Mach-Zehnder interferometer at internal phase shifts of 0 and $\pi$.

10. The method of claim 9, wherein determining the splitting errors for the first beam splitter and the second beam splitter of the first Mach-Zehnder interferometer comprises:

determining amplitudes of the splitting errors based on the light intensity transmitted from the first input and the second input of the first Mach-Zehnder interferometer to the first output and the second output of the first Mach-Zehnder interferometer as a function of the external phase shift applied by the external phase shifter of the first Mach-Zehnder interferometer at the internal phase shifts of 0 and $\pi$; and resolving signs of the splitting errors based on the light intensity transmitted from the first input and the second input of the first Mach-Zehnder interferometer to the first output and the second output of the first Mach-Zehnder interferometer as a function of the external phase shift applied by the external phase shifter of the first Mach-Zehnder interferometer at the internal phase shift of $\pi/2$.

11. The method of claim 1, wherein the network of interconnected Mach-Zehnder interferometers is a triangular network of interconnected Mach-Zehnder interferometers, wherein the first Mach-Zehnder interferometer comprises a first beam splitter and a second beam splitter coupled to the internal phase shifter of the first Mach-Zehnder interferometer, and determining the individual component errors within the first Mach-Zehnder interferometer comprises:

calibrating the internal phase shifter of the first Mach-Zehnder interferometer based on light intensity transmitted from a first input of the first Mach-Zehnder interferometer to a first output of the first Mach-Zehnder interferometer as a function of the internal phase shift applied by the internal phase shifter of the first Mach-Zehnder interferometer; and determining splitting errors for the first beam splitter and the second beam splitter based on light intensity transmitted from the first input and a second input of the first Mach-Zehnder interferometer to the first output and a second output of the first Mach-Zehnder interferometer as a function of the internal phase shift applied by the internal phase shifter of the first Mach-Zehnder interferometer.

12. The method of claim 1, wherein the network of interconnected Mach-Zehnder interferometers is a triangular network of interconnected Mach-Zehnder interferometers and the first Mach-Zehnder interferometer and the second Mach-Zehnder interferometer are in a first diagonal in the triangular network of interconnected Mach-Zehnder interferometers, and further comprising, after determining the individual component errors within the second Mach-Zehnder interferometer:

programming the first diagonal to act as a homodyne detector; and calibrating other Mach-Zehnder interferometers in the triangular network of interconnected Mach-Zehnder interferometers with only intensity measurements.

13. A method of correcting individual component errors in a programmable photonic circuit comprising a network of interconnected Mach-Zehnder interferometers, the method comprising:

determining the individual component errors within each Mach-Zehnder interferometer in the network of interconnected Mach-Zehnder interferometers;

determining external phase shifts and internal phase shifts for respective Mach-Zehnder interferometers in the network of interconnected Mach-Zehnder interferometers that correct the individual component errors for the respective Mach-Zehnder interferometers;

applying, by internal phase shifters in arms of the respective Mach-Zehnder interferometers, the internal phase shifts to the respective Mach-Zehnder interferometers, the internal phase shifts correcting splitting errors induced by the respective individual component errors;

applying, by external phase shifters at inputs and/or outputs of the respective Mach-Zehnder interferometers, the external phase shifts to the respective Mach-Zehnder interferometers, the external phase shifts correcting input phase errors induced by the respective individual component errors; and applying, by auxiliary phase shifters at outputs of the network of interconnected Mach-Zehnder interferometers, auxiliary phase shifts to correct output phase errors induced by the individual component errors.

14. The method of claim 13, wherein the internal phase shifts compensate for static fabrication errors induced by beam splitters in the Mach-Zehnder interferometers.

15. The method of claim 13, wherein applying the internal phase shifts and/or applying the external phase shifts reduces an error of a matrix operation implemented by the programmable photonic circuit.

16. The method of claim 13, wherein applying the internal phase shifts and/or applying the external phase shifts increases a fabrication tolerance of an optical neural network computed in the programmable photonic circuit.

17. The method of claim 13, wherein applying the internal phase shifts and/or applying the external phase shifts corrects at least one error in operation of the programmable photonic circuit.

18. The method of claim 13, wherein determining the individual component errors within each Mach-Zehnder interferometer comprises:

calibrating the internal phase shifter for that Mach-Zehnder interferometer; and determining splitting errors for beam splitters of that Mach-Zehnder interferometer.

19. The method of claim 18, wherein determining the individual component errors within each Mach-Zehnder interferometer further comprises:

calibrating the external phase shifter for that Mach-Zehnder interferometer.

20. The programmable photonic circuit with individual component errors corrected according to the method of claim 13.

* * * * *